(12) United States Patent
Kaplan

(10) Patent No.: US 7,155,157 B2
(45) Date of Patent: Dec. 26, 2006

(54) METHOD AND SYSTEM FOR ASYNCHRONOUS ONLINE DISTRIBUTED PROBLEM SOLVING INCLUDING PROBLEMS IN EDUCATION, BUSINESS, FINANCE, AND TECHNOLOGY

(75) Inventor: Craig A. Kaplan, Capitola, CA (US)

(73) Assignee: IQ Consulting, Inc., Capitola, CA (US)

( * ) Notice: Subject to any disclaimer, the term of this patent is extended or adjusted under 35 U.S.C. 154(b) by 33 days.

(21) Appl. No.: 09/957,656

(22) Filed: Sep. 20, 2001

(65) Prior Publication Data

US 2002/0076674 A1   Jun. 20, 2002

Related U.S. Application Data

(60) Provisional application No. 60/234,438, filed on Sep. 21, 2000.

(51) Int. Cl.
*G09B 11/00* (2006.01)

(52) U.S. Cl. .................. 434/350; 434/307 R; 434/323; 434/365

(58) Field of Classification Search ................. 434/323, 434/322, 350, 307 R, 118, 362, 353, 365
See application file for complete search history.

(56) References Cited

U.S. PATENT DOCUMENTS

| | | | |
|---|---|---|---|
| 4,539,904 A * | 9/1985 | Vick et al. ..................... 99/618 |
| 4,713,775 A | 12/1987 | Scott et al. | |
| 4,745,468 A | 5/1988 | Von Kohorn | |
| 4,872,122 A | 10/1989 | Altschuler | |
| 5,784,539 A * | 7/1998 | Lenz ........................... 706/45 |
| 5,862,223 A | 1/1999 | Walker et al. | |
| 6,064,978 A * | 5/2000 | Gardner et al. ............... 705/10 |
| 6,223,165 B1 | 4/2001 | Lauffer | |
| 6,275,811 B1 * | 8/2001 | Ginn ........................... 705/10 |
| 6,400,996 B1 * | 6/2002 | Hoffberg et al. .............. 700/83 |

OTHER PUBLICATIONS

Experts Exchange, May 14, 2000, www.experts-exchange.com, pp. 1-85.*
AllExperts, 1998, www.allexperts.com, pp. 1-10.*
SETI, SETI@home, Dec. 1998, Search for Extraterrestrial Intelligence, pp. 1-10.*
Merkey, Phil, "Beowulf Introduction and Overview", Sep. 1998, CESDIS Beowulf Project, pp. 1-3.*
Sterling, Thoma, "How To Build A Hypercomputer", Jul. 7, 2001, Scientific American, pp. 1-10.*

* cited by examiner

*Primary Examiner*—Kathleen Mosser
(74) *Attorney, Agent, or Firm*—Perkins Coie LLP

(57) ABSTRACT

Systems and methods facilitating authoring and problem solving by joint contributors working separately but against a common goal. On-line asynchronous distributed authoring and problem solving system, method, and computer program for focusing attention toward particular authoring and problem solving topics using a threaded discussion group and reward matrix. System, method, computer program and computer program product for coordinating the activities of a plurality of people, where the plurality may be any number from two to thousands or more people. Mechanism for directing the attention and focus of large numbers of people who are solving problems using a tree-based problem space, where the tree based problem space may be a virtual problem space. Algorithms and procedures for evaluating nodes in the virtual problem space and assigning values via a pay-off matrix that serves to focus the attention of large numbers of problem solvers. Combination of threaded discussion groups with the pay-off matrix and a variety of algorithms to create useful system for solving multi-level problems leveraging human expertise.

87 Claims, 12 Drawing Sheets

World Think

A Global Community of Online Experts
Home | FAQ's | Projects | Charity | About Us Thanks for donating some of your time to help solve problems for charity!

Every problem on WorldThink consists of topics. Topics may contain other topics, questions, or information posts. Currently, we have only one problem available for you to work on. Its major topic is titled: Test and Improve the System.

Each topic lists the Maximum Donation (e.g. $500) available to donate to charity for posts related to that topic, or any of its sub-topics, or question topics.

Each time that a member posts an answer to a question, and/or proposes a new question for others to answer, WorldThink will make a donation ($1 - $10) to The Hunger Site based on the quality of the answer.

Click on Test and Improve the System below to view activities related to this project.

| Topic | Msgs | Last Updated |
|---|---|---|
| $500 Test and Improve the Systems | 12 | September 19 – 10:24 pm |
| Current funding for this project: $500 | | |

Fig. 4A

World Think

⟅⎯⎯⎯⎯⎯⎯⎯⎯⎯ A Global Community of Online Experts
Home | FAQ's | Projects | Charity | About Us

$500 Test and Improve the System

WorldThink is currently a prototype system. Your help will create a better and more stable system. The total charitable donation amount of $500 has been split among several questions.

Please choose a question you may be able to answer.

| | Subtopic | Msgs | Last Updated |
|---|---|---|---|
| ▦ | $100 What would motivate you to solve problems on WorldThink frequently? | 1 | 09/19 05:47pm |
| ▦ | $100 Do you know any talented programmers or executives that might be interested joining the WorldThink team once we get funding? | 5 | 09/19 10:02pm |
| ▦ | $100 For what types of problems do you think WorldThink would be most valuable and useful? | 0 | 09/19 05:10pm |
| ▦ | $100 Have you experienced any bugs or formatting problems while using WorldThink? | 0 | 09/19 04:35pm |
| ▦ | $100 What could we do to make the system easier to use? | 6 | 09/19 10:24pm |

To create a new Subtopic, click on the button below. Your new Subtopic will appear underneath those listed above.

[ Post New Subtopic ]

FIG. 4B

World Think

⟋‾‾‾‾‾‾⟍ A Global Community of Online Experts
Home | FAQ's | Projects | Charity | About Us

$100 What could we do to make the system easier to use?

| Subtopic | Msgs | Last Updated |
|---|---|---|
| $10 Could we add better navigation features? | 1 | 09/19 10:08pm |
| $10 Could we have an auto-numbering feature for posts? | 1 | 09/19 10:11pm |
| $80 Could we display more levels of the tree all at once? | 4 | 09/19 10:24pm |

[ Post New Subtopic ]

FIG. 4C

World Think

___ A Global Community of Online Experts
Home | FAQ's | Projects | Charity | About Us

$80 Could we display more levels of the tree all at once?

ck Tuesday, September 19, 2000 – 10:14 pm The idea here is that there are an awful lot of mouse clicks to explore what people have already said. I'd like to be able to view many levels of the what people said - at least the titles – all at once. This may be called a threaded discussion group format, and it is what we need.

| Subtopic | Msgs | Last Updated |
|---|---|---|
| Does anyone know of shareware or public domain threaded discussion group software? | 1 | 09/19 10:17pm |
| What about building our own threaded system? | 1 | 09/19 10:19pm |
| What about a dynamically expandable tree? | 1 | 09/19 10:24pm |

Post New Subtopic

FIG. 4D

World Think

⎯⎯⎯⎯⎯⎯ A Global Community of Online Experts
Home | FAQ's | Projects | Charity | About Us What about a dynamically expandable tree?

<u>ck</u>  Tuesday, September 19, 2000 – 10:24 pm  One of the problems with a threaded discussion group where you always see all the threads is that if there is a lot of discussion in an area that you are not interested in, you have to wade past all that to get to the stuff you are interested in. But if the first level was displayed, and then you could just keep clicking down and seeing more and more levels of the tree, that might be pretty cool. That's sort of how windows explorer and a lot of programs work. I guess the question is, how would that work on the web efficiently?

Subtopic                                                                 Msgs    Last updated

Post New Subtopic

FIG. 4E

METHOD AND SYSTEM FOR ASYNCHRONOUS ONLINE DISTRIBUTED PROBLEM SOLVING INCLUDING PROBLEMS IN EDUCATION, BUSINESS, FINANCE, AND TECHNOLOGY

RELATED APPLICATIONS

This application claims priority to U.S. Provisional Patent Application Ser. No. 60/234,438 filed Sep. 21, 2000 entitled Online Distributed Problem Solving System, which is hereby incorporated by reference.

FIELD OF THE INVENTION

This invention pertains generally to systems and methods facilitating authoring and problem solving by joint contributors working separately but against a common goal, and more particularly to an on-line asynchronous distributed authoring and problem solving system, method, and computer program for focusing attention toward particular authoring and problem solving topics using a threaded discussion group and reward matrix.

BACKGROUND

Heretofore, conventional off-line and on-line problem solving techniques have been fraught with limitations. Conventional wisdom and prior research on problem solving has traditionally held that that the effectiveness of group problem solving decreases as the number of people in the group increases. Although groups may be useful for brainstorming, for reviewing ideas and documents, and division of labor, it is generally agreed that coordination and communication problems increase exponentially with the size of the group.

Simply coordinating the calendars of many people working on a common problem, set of problems, or project can prove a major obstacle unless (as in the case of the military) there is an absolute authority that can demand people conform to a particular schedule. Simple math shows that if even if there is a 90% chance that a given meeting time is good for each particular person involved, there is only about one chance in three that a particular meeting time will work if ten people are involved ($0.9^{10}$=0.34).

What applies to scheduling, also applies to communication. Again, if ten people meet, and even if each has a 90% chance of making comments that keep the meeting on track and only a 10% chance of making a tangential comment that side-tracks the meeting, there is still a two-thirds chance that the meeting will be side-tracked. As more meeting participants are added, the situation only gets worse.

With forty-five people participating, again assuming a 10% chance of an off-track comment or schedule conflict per person, there is more than a 99% chance that a scheduled meeting time will not work for someone or that the meeting will be sidetracked even if the group does manage to get together.

These simple mathematical facts are a major reason why some organizations try to keep teams small. If large numbers of people are involved—it very quickly becomes nearly impossible to get anything done.

On the other hand, teams and even large teams of people do have advantages. A primary advantage is summed up by the adage: two heads are better than one. With more people, comes more expertise. And research in problem solving has shown that the availability of relevant expertise is a major factor in coming up with good problem solutions.

Conventional wisdom and prior research on problem solving has therefore established that while small teams may be useful in cases where additional relevant expertise is desirable, the coordination and communication problems inherent in a concurrent team approach makes large teams impractical.

Offline technology such as conference calls on the telephone, video-conferencing, jet travel, and the like, has made it somewhat easier to schedule group work, but as long as the group members must all work together at the same time, the limitations described above cannot be avoided.

Conventional on-line problem solving systems and methods also have limitations. Such online technology systems, ranging from E-mail to groupware and collaborative problem solving systems such as Lotus Notes and other web based systems, represent a great advance over offline problem solving technology, primarily because they allow asynchronous work. For example, with E-mail, group members can exchange ideas without having to both be available for a phone call at the same time. Each group member can work on his or her own schedule—asynchronously.

Unfortunately, even though the scheduling problems are somewhat ameliorated by asynchronous offline technologies such as E-mail, the problem of getting off-track as the number of team members increases still exists. In addition, online technologies such as E-mail can easily lead to information overload—something most of us have experienced when we come to work and confront dozens (or sometimes even hundreds) of E-mail messages waiting for us when we return to our workplace.

Structure has been added to E-mail programs to allow users to sort E-mail and categorize it—even to add rules to automatically accept or reject messages. But little has been done with E-mail to facilitate group problem solving specifically. Those systems that do target collaborative work focus on small groups or teams. The software basically attempts to duplicate the same sorts of things that take place in regular conventional offline problem-solving groups—only with the added capability of allowing members to work asynchronously as well as synchronously, and with the capabilities to exchange documents and information online.

E-mail and groupware thus make problem solving somewhat more efficient and easier to conduct across geographically dispersed groups, but little has been done to support problem solving by large groups of people. Specifically, substantially all the same communication and coordination problems exist when large groups are involved.

Some groupware attempts to overcome some of these coordination problems via process or project management techniques that result in very structured flows on work. For example, with Lotus Notes it is possible to design document management and workflow solutions that route documents from person to person in a very structured way. However, most Notes applications allow only one person at a time to change the documents. If large numbers of people were allowed to simultaneously modify Notes documents, chaos would rapidly ensue since there is no capability in the product to organize revisions by large numbers of simultaneous users.

Similarly, the WEBDAV protocol, which represents state-of-the-art technology for web-based collaborative authoring—and which has been adopted by Microsoft, Adobe, and other companies to enable their existing applications (for example, Microsoft Word) for collaborative work—allows only one user at a time to modify a document.

Those systems that do allow multiple users to change the same document simultaneously are designed for small groups of people working carefully in different places to avoid the situation of one person undoing someone else's revisions.

In short, traditional online groupware applications are currently unable to effectively manage the simultaneous editing of many individuals much less support more sophisticated types of large-scale problem-solving efforts.

The Threaded Discussion Group (TDG) represents another standard tool that has emerged for exchange between many individuals. A threaded discussion group is an example of a tree structure. Discussion group software allows people to post questions on a website. Other people can read these posted questions and respond with answers or relevant ideas of their own.

To keep track of the proliferation of questions, answers, and other ideas that people post, software has been developed that organizes people's posting according to a tree-structure, where each major topic in the community discussion corresponds to a branch in the tree. As more topics, also known as threads, are added to the discussion, the tree structure adds more branches to track them. Discussion groups or bulletin boards that make use of threads are called Threaded Discussion Groups (TDGs).

Recently a variety of websites have come into being that use TDGs, E-mail, and/or other existing online tools to try to provide answers to people with simple questions about a wide range of subjects. For example, the site ASKME.com offers advice on subjects as diverse as UFOs and computer programming. Many other sites exist, all using variants of the same or similar technology, that specialize in offering advice in different areas, and with different business models—ranging from free advice in return for watching advertising to charging a fee for connecting advice seekers with advice givers, who then solve or attempt to solve the problem or give advice offline using conventional approaches.

Many of these online Question and Answer (Q&A) services use TDGs as one means for posting advice. A major advantage of this tree structure is that it organizes the online posts in a hierarchical way, which makes it easier for people to follow the exchange of ideas. The use of tree-structures as data structures that offer an efficient way of organizing information is well known in the field of computer science. Since computer scientists invented online bulletin board systems in the early days of the Internet, it is not surprising that tree-like structures were used to organize the exchange of ideas.

As Q&A sites are the closest existing technology to an asynchronous online problem solving system that allows easy access to a wide variety of experts, the following discussion primarily focuses on the current limitations of these systems.

What all existing Q&A sites have in common is that they are able to answer only relatively simple questions. If a problem requires multiple steps to solve, or expertise from multiple experts, users are forced to submit a series of questions which is very inefficient and time consuming. The net result is that Q&A sites are used for simple, quick answers. If more complicated problem solving is required, users typically try to work with experts offline.

In fact, some of the Q&A sites have built their business around this existing technology limitation. For example, EXP.COM specializes in matching people seeking advice with experts who provide bids and then do most of their work offline. This business model is based on the fact that currently there is no good way to solve complicated, multi-step problems online—which is why the brokering approach seems attractive.

While TDGs are a powerful technology that facilitates simple online Q&A services, known conventional software which displays and organizes the ideas of people who post information online, suffer from a number of disadvantages that limits the utility and effectiveness of such systems and methods. Some major disadvantages include the following: (1) Existing online tools and systems that are accessible by large numbers of experts, cannot support complex, multi-step problem solving. (2) Existing online tools and systems that can reach large numbers of experts, do a poor job of integrating the work of multiple experts—especially if these experts do not know each other, and have never worked together before. (3) Existing online tools and systems all suffer from the disadvantages that affect all forms of offline and online problem solving to date, namely that communication and coordination problems increase and quickly become intractable as the number of participants increases.

Some of the reasons that these disadvantages exist in current systems (and especially in TDGs which heretofore represent the best known approach to online problem solving that is open to many experts) are summarized immediately below. First, discussions frequently get off track as people express tangential opinions. Second, the amount of information displayed can quickly become overwhelming and take too long to read. Third, people often post repetitive information, which is inefficient and adds to the burden of others trying to find new relevant information. Fourth, people with problems have no way of ensuring that online experts will check the bulletin board in time for the answers to be useful to them. Similarly, experts trying to build off of other experts' work don't know how long they will have to wait before they can proceed. Fifth, the likelihood of solving a problem tends to decrease multiplicatively with the number of information exchanges required to solve the problem because the first four factors each reduce the probability of successfully completing each information exchange step. Sixth, the likelihood of solving a problem tends to decrease multiplicatively with the number of experts required to solve the problem because the first four factors each reduce the probability that a given expert will participate. Seventh, misinformation can be spread by the system because there is no efficient method for controlling the quality and accuracy of the information posted by experts. In particular, rating systems from the question posters, which have been employed by some online information exchanges, have limited effectiveness at quality control because the very fact that the questioner is asking a question suggests that the questioner lacks a particular type of expertise—that, after all, is why she/he is asking the question. Eighth, a large quantity of time is typically required of a SYSOP or other human moderator in order to ensure that the local rules of TDG are followed, and in order to organize and trim the tree structure so that the information exchange remains usable. This list of factors is only exemplary and does not identify all of the reasons for the failure or limitations of conventional systems and methods.

Slashdot.org is an example of the state-of-the-art technology for reducing irrelevant information on discussion boards. Slashdot asks its trusted users to rate the postings of other users. Users can then specify whether they would like to see all the postings, or only those postings with a rating above a specific cut-off number. Although Slashdot (and similar sites such as, for example, Kuro5hin.org and advogato.org) use ratings to try to filter information, none of these sites are designed specifically to support problem solving and do not use ratings as a mechanism for directing the flow of problem solving activity.

Therefore, there remains a need for system and method that overcome the problems and limitations present in conventional approaches.

BRIEF DESCRIPTION OF THE DRAWINGS

FIG. 4 is a diagrammatic illustration showing embodiments of screen displays or screen shots during operation of an embodiment of the invention.

SUMMARY

Figure 1:
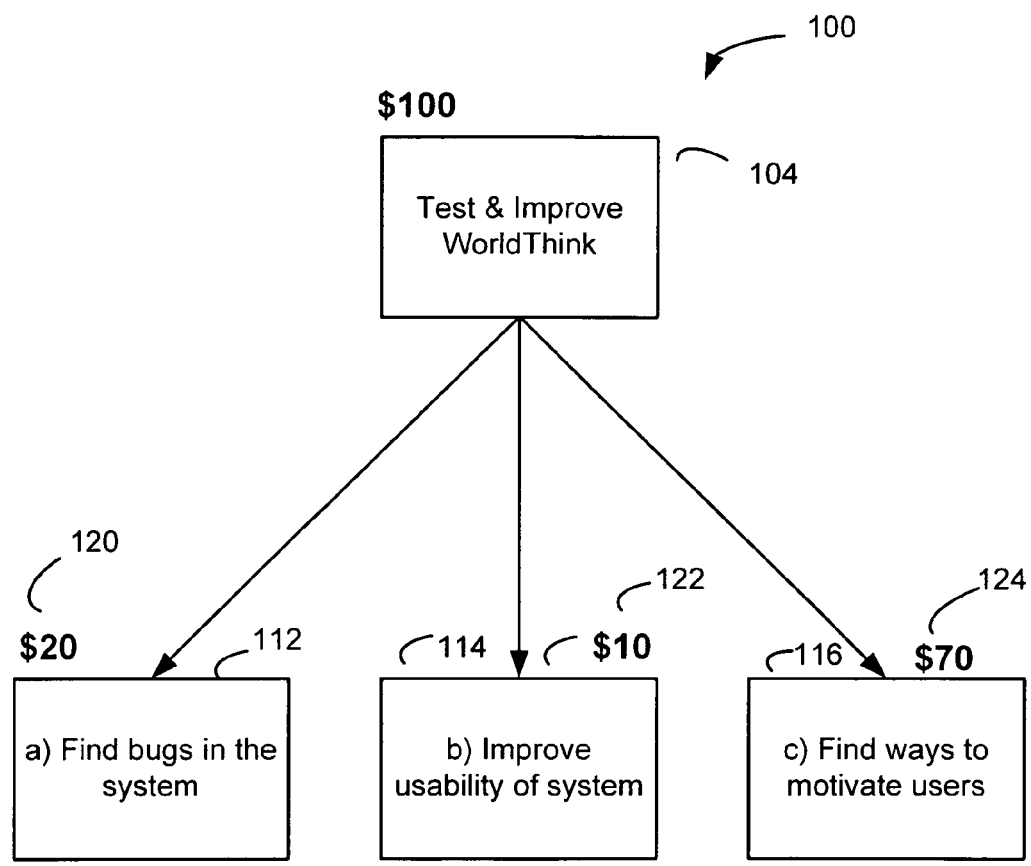
FIG. 1 is a diagrammatic illustration showing an embodiment of a problem tree diagram and reward or payoff matrix values which shows several questions listed under a general topic in hierarchical tree structure after a first phase of operation.

At one level, the invention provide system, method, computer program and computer program product for coordinating the activities of a plurality of people, where the plurality may be any number from two to thousands or more people. It also provides a mechanism for directing the attention and focus of large numbers of people who are solving problems using a tree-based problem space, where the tree based problem space may be a virtual problem space. The invention further provides algorithms, procedures, and implementations for evaluating nodes in the virtual problem space and assigning values via a pay-off matrix that serves to focus the attention of large numbers of problem solvers. Embodiments of the invention provide for the use of combinations of threaded discussion groups with the pay-off matrix and a variety of algorithms from computer science to create an entirely new and highly useful system for solving multi-level problems leveraging human expertise instead of artificial intelligence as has been done previously. Embodiments of the invention provide a mechanism and method for drawing the attention of the particular types of experts to particular places in the virtual problem space where their expertise is most needed via a database system that matches their skills (as specified in the database) to the on-going and ever-developing needs for skills of different types as reflected in the virtual problem space.

The inventive system and method may be applied to solve all manner and type of problems and in virtually all disciplines that involve intellectual activity and result in the generation of an intellectual work product, such as a report or recommendation. In a sense any activity that would be consider the realm of a consultant or group of consultants is ripe for application of the invention. Software design, system design, engineering design and analysis, educational testing and assessment and well as materials preparation, business and financial consulting, and a great variety of other fields and disciplines benefit from the inventive system and method.

In a further aspect, embodiments of the invention provide a method for building-in rules to a threaded discussion group that effectively implement various known search algorithms and allow the implementation of newly created search algorithm, including for example the ability to specify that no more than a predetermined number of new response can be generated to any problem before the responses must be evaluated, the best one chosen, and the process repeated.

In still another aspect, embodiments of the invention provide a mechanism for incorporating peer ratings in the context of a threaded discussion group or other communication mechanism in which the peer ratings lead to a pay-off matrix, and in which the peers themselves are evaluated in terms of their credibility allowing the peer ratings to be weighted by the system as it learns more about the problem solving effectiveness of each of the peer-experts.

In an additional aspect, embodiments of the invention provide an ability to use a threaded discussion group as a virtual problem space, which maps the progress of the problem solving effort and provides a permanent, navigable record of the ideas produced together with the evaluation of each idea.

In another aspect, embodiments of the invention provide a system for bringing more minds to focus on a problem simultaneously in a coordinated way than previously existing systems.

In even still another aspect, embodiments of the invention provide a system that incorporates parameters that allows customers to easily control the problem solving effort by manipulating the values in the payoff matrix to incent behavior that meets customer needs such as quantity of ideas, quality of ideas and speed with which ideas are generated, where as used here, the term "ideas" is a general term meant to encompass intellectual work products of all sorts.

In yet another aspect, embodiments of the invention provide a system for effectively limiting off-topic posts in a threaded discussion group by via manipulation of values in a pay-off matrix.

In another aspect, embodiments of the invention provide a system for combining a threaded discussion group with a synchronized clock cycle so that there is a periodic cut-off for acceptance of new ideas on a particular topic which is a parameter that can be controlled by a customer.

In another aspect, embodiments of the invention provide a system for filtering content by displaying only those posts that have higher than a certain threshold monetary values as set by the participant and/or the customers.

In another aspect, embodiments of the invention provide the ability to reward expert posters based on the degree to which their posts actually solved a problem and to use methods of assignment of blame and credit to determine the value that each post, in a long sequence of posts, contributed towards the ultimate solution of the problem.

In another aspect, embodiments of the invention provide the implementation of a virtual problem space with search control capability using threaded discussion groups and other techniques.

In still another aspect, embodiments of the invention provide system and method for posting a monetary value or other reward or compensation next to or associated with each post and of providing easy ways for users of the system to find the open problems with the most monetary value that best fit their expertise In yet another aspect, embodiments of the invention provide system and method that serve various educational, teaching, and learning needs including providing capabilities for rapid test item development, rapid scoring of constructed response and essay-types of test items, rapid association of educational content with test items/sections, rapid development of new educational content, and abilities to identify, develop, and share educational practices.

DETAILED DESCRIPTION OF EMBODIMENTS

The inventive Online Distributed Problem Solving (ODPS) system and method provides a means to facilitate fast and effective online problem solving of problems that require multiple steps and/or multiple experts without the disadvantages of existing approaches. One significant benefit of ODPS is that it avoids the problems that force other problem solving technologies, both online and offline, to limit the number of experts or other persons or users working on a problem. Because ODPS can focus the problem solving capabilities of many experts without suffering the usual disadvantages of large groups, ODPS can solve problems faster and more effectively than any other offline or online system.

The "online" part of ODPS refers primarily to the fact that all the problem solving work can occur online asynchronously. While face-to-face or phone contacts between people is possible, and sometimes helpful, it is not necessary for the system to solve complex multi-step problems and/or problems requiring multiple sources of expertise. This capability to solve complex problems online represents a technological leap compared to existing online Threaded Discussion Groups (TDG) or Question and Answer (Q&A) systems.

The "distributed" part of ODPS refers primarily to the fact that the problem solving work is distributed among experts in such a way that the best available experts are working on the tasks that best fit their expertise. Effective matching of experts to those tasks that fit their expertise is a primary reason why ODPS can scale to include large numbers of experts, without suffering from the communication and coordination limitations inherent in large groups. The ease and speed with which tasks can be distributed represents a technological leap compared to existing online or offline problem solving technologies.

It will be appreciated that tree-structures have also been used by Cognitive Psychologists to model human problem solving behavior. In their classic book, *Human Problem Solving* (1972), Newell and Simon describe models of human problem solving that use tree-structures which they call problem spaces. Theories of human cognition emphasize the role that attention plays in successful problem solving.

The inventive system and method recognize that many of the limitations of existing TDGs were due to the lack of an attentional mechanism. Basically, people cannot solve complex problems using conventional existing TDGs alone because there is no good way of maintaining focused attention of the expert in a multi-step problem. And, when expertise from more than one expert is needed, the situation is even worse, almost hopeless in some cases. However, if attention is focused, and if the right sub-problems are brought to the attention of the right experts at the right time, while preserving a shared representation of the problem that all experts can refer to, then an efficient and effective system of online distributed problem solving is possible.

An embodiment of the inventive ODPS system and method are now described relative to a hypothetical problem solving situation. Imagine that a customer has developed a new software system, named WorldThink, which he wants to test and improve. This customer could use the ODPS system by posting a general topic, together with some more specific questions relating to the topic, on TDG. To incent online experts visiting the TDG to answer specific questions, the customer can associate dollar values with each of the questions, offering to pay up to the total dollar value for each question to experts who provide useful answers. Note that references to threaded discussion groups are merely one example of a type of hierarchical tree based structures that may be used with the invention and that the invention applies to and may be used with a variety of tree-based structures and techniques. TDGs are conveniently used in this description as there are many commercial software packages and Internet web sites that provide or support TDGs.

In FIG. 1 there is shown a tree diagram 100 which shows several sub-topics are listed under the general topic of: Test and Improve WorldThink 104, where WorldThink is the name of a hypothetical software system. Each of these sub-topics represents a branch of the problem tree or virtual problem space (VPS) 101. Experts can help solve the overall problem of testing and improving the software system called WorldThink by taking one of the three branches: (i) commenting on any bugs they might find with the system (Branch a) 112, (ii) commenting on how to make the system easier to use (Branch b) 114, or (iii) commenting on how to help motivate users of the system (Branch c) 116.

The dollar amounts 120, 122, 124 next to each of these branches indicates how much money the customer is willing to pay for a high quality ideas that address the topic—help solve the sub-problem—of that branch. This assignment of dollar amounts (or other incentives that can be expressed quantitatively such as points) to problem branches is called the payoff matrix 130. The payoff amounts in the payoff matrix represent money that has not yet been paid, but is available to be paid for work that addresses a specific problem or sub-problem. Frequently, problems and sub-problems are expressed as a question.

As an overall problem is split into sub-problems, the total payoffs for all the sub-problems must equal the total payoff for the overall problem. For example, in FIG. 1, the total payoff for overall problem of testing and improving WorldThink is $100. This $100 is then spilt among the three sub-problems in amounts of $20, $10, and $70—whose sum is the original $100. Amounts showed outside the box or a node are maximum amounts allocated while amounts shown internal to the box of the node is the amount actually paid out. Note that the amount paid out may be less than the maximum. In some embodiments a minimum payout may also be identified to a node.

In FIG. 1, Branch (c) 116 has the highest dollar figure or value among the branches available to solve or contribute so experts will be most motivated to comment on this topic—as long as they have relevant expertise in this area. As experts begin to focus attention on the high-paying topics, they may post responses to these topics and/or they may raise new topics using the standard features of existing bulletin board or TDG software. Sometime after an expert has posted a response to a question or raised a new topic (which may be a new sub-problem), the responses and new topics from experts are evaluated, experts are paid, and a new payoff matrix is calculated and posted.

For example, consider the example of FIG. 1, and assume that an expert E1 responds to Branch (c) 116 suggesting a way to motivate users of the system by donating money to charity, new Branch (d) 142. Expert E1 also proposes a new question, Branch (e) 144, namely: "How do we determine which charities are most motivating to people?" An evaluation algorithm runs, evaluates the quality of E1's posts, and determines how much to pay E1 for his suggestion of using charity to motivate users. Assume the algorithm determines E1's suggestion is worth $10. Next, the algorithm then estimates the worth of E1's new question. Assume the algorithm determines E1's new question is worth $5. The algorithm subtracts the amounts due to E1 for his answer and new question ($15) 143 and recalculates the payoff matrix.

Figure 2:
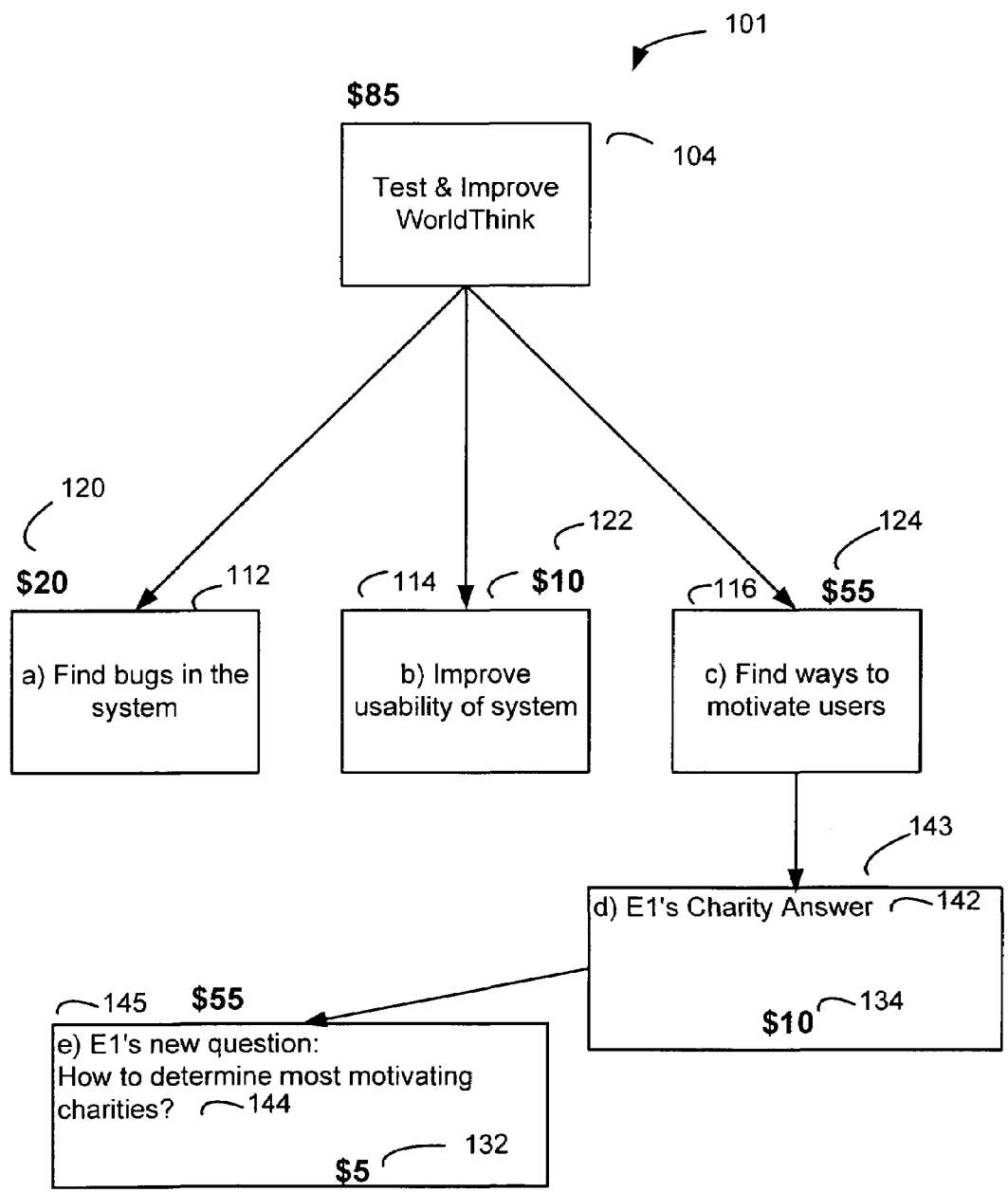
FIG. 2 is a diagrammatic illustration showing an embodiment of the problem tree in FIG. 1 at a later second phase of operation.

After these calculations, the problem tree 101 and payoff matrix 130 would look something like what is depicted in FIG. 2 with added Branch (d) 143 for E1's charity answer 142, and Branch (e) 145 for E1's new question 144. Note that the dollar amounts inside the boxes 132, 134 represent money paid to experts, while the dollar amounts outside the boxes 120,122, 136 represent the payoff matrix. Note also that the payoff values for different branches may change or be reassigned over time to meet customer or other needs.

Figure 3:
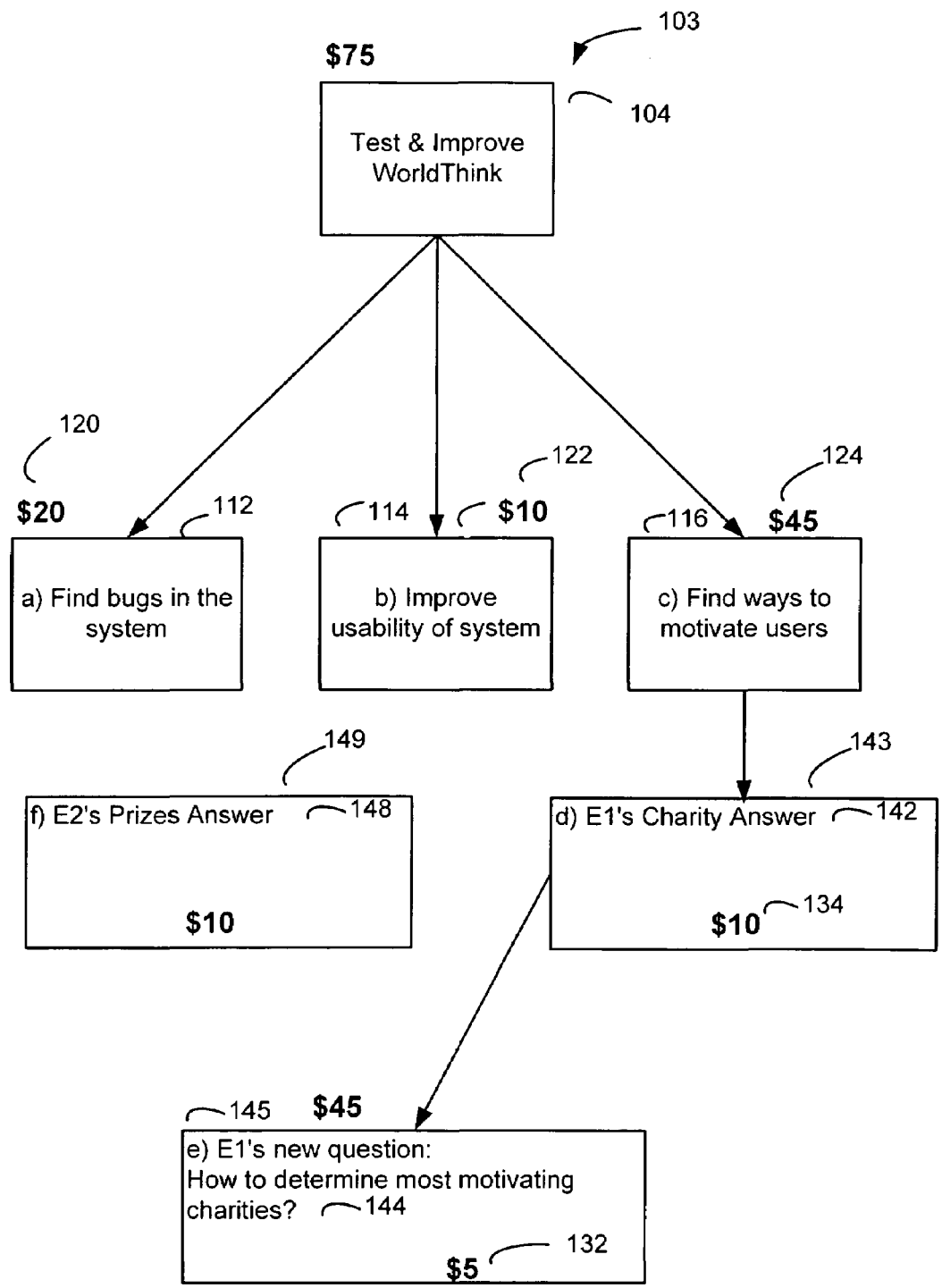
FIG. 3 is a diagrammatic illustration showing an embodiment of the problem tree in FIG. 2 at still a later third phase of operation.

As a final illustration of how the online problem solving system works, imagine that another Expert (E2) posts a response 148 to the question about how to motivate users. E2 suggests a response 148 giving prizes to users which creates a Branch (f) 149. The algorithm runs, as above, and the new result is shown in FIG. 3. Note that in this example as more money is paid to the experts, the total payoff for answering remaining problems is reduced. This reflects the fact that progress is being made on solving the problem, and that the experts are being paid for their efforts as the problem-solving progresses. If the payoffs drop too low (perhaps even to zero) for a particular topic or for the problem as whole, focus may be lost unless the customer increases the payoffs by allocating more money to the problem.

Screens shots from an actual prototype system implementing this simple example are shown in FIG. 4. These screen shots illustrate the threaded nature of the virtual problem space, and show how rewards can be simply added to the system by posting dollar values next to each topic. Topics with higher dollar values tend to attract more problem-solving effort from online experts. This simple mechanism is at the heart of the ODPS system, as it allows a way of motivating human experts to behave as if they were following a wide variety of proven search algorithms.

In FIG. 4A, there is shown a embodiment requesting contributions for testing and improving the system. It shows the topic, the number of messages related to the topic, and the last date and time it was updated. In this particular example, features of the ODPS are briefly explained and donations to charity for postings are encouraged. In FIG. 4B, the overall topic "Test and Improve the System" and the total payoff amount ($500) are listed along with five subtopics are listed along with the number of messages (Msgs) and the date and time of the last update. A reward or payoff amount of $100 is also identified for contributions to a listed topic. A button that a contributor may click is also identified for posting a new subtopic. In this example, three subtopics have received messages or postings and two have not. FIG. 4C illustrates an additional web page showing more detail of the "What could we do to make the system easier to use?" thread or sub-topic. The sub-topics are each valued and include $10 for "Could we add better navigation features?", $10 for "Could we have an auto-numbering feature for posts?", and $80 for "Could we display more levels of tree all at once?".

FIG. 4D shows even further detail for the $80 for "Could we display more levels of tree all at once?" node, breaking it down into three further levels or branches, including: "Does anyone know of shareware or public domain threaded discussion group software?", "What about building our own threaded system?", and "What about a dynamically expandable tree?" Again, provision is made for posting a new subtopic using a clickable button, though other means may be provided. FIG. 4E shows a response to the "What about a dynamically expandable tree?" posting.

Having now described some of the features and procedures of the inventive system and method, an overview of an embodiment of the ODPS method is now provided. This overview is followed by a detailed description of another embodiment, a discussion of some ways in which the inventive system and method overcome disadvantages of conventional systems and methods, and a particular exemplary embodiment associated with educational and teaching/learning/testing systems.

In one aspect, ODPS is a form of problem solving. Newell & Simon (1972) have shown how all problem solving can be represented as search through a problem space such as though a hierarchical tree structure having a plurality of nodes and branches.

The key to effective problem solving is, according to Newell and Simon, effective search. Effective search, in turn, depends on focusing attention of the problem solver(s) on exploring the part of the problem space (tree) that has the highest chance of yielding a problem solution.

Embodiments of the ODPS system and method use the existing technology of TDGs to provide the tree structure that can be searched simultaneously by many problem solvers. This online tree structure, implemented by a TDG which resides on a website, is referred to as the Virtual Problem Space (VPS). Unlike other forms of software groupware that typically require small virtual teams to use specialized software in order to make progress, the VPS can be accessed by large numbers of online experts simultaneously, using only a conventional web browser.

To implement search, ODPS focuses and directs the problem solving efforts of large numbers of experts. By associating rewards (in some quantifiable form, such as for example: money, points, recognition, or the like) with exploring various branches of the VPS, ODPS focuses and directs the experts' problem solving efforts. This ability to focus and direct the attention of the experts is an important foundation for implementing a wide variety of specific search algorithms.

Search Control Algorithms control the direction of search through the VPS. These algorithms set the rewards and thus effectively control the focus of many problem solvers as they work in parallel on the problem online. By adjusting the payoff amounts and other parameters, the Search Control Algorithms can increase or decrease the likelihood of innovation, speed, quality, and other aspects of the problem solutions.

The field of computer science in general, and the subfields of Artificial Intelligence, Game Theory, and Search Algorithms, in particular, contain many algorithms that may be adapted for use with ODPS by programmers and computer scientists skilled in their fields. For example, the search control algorithm described above may be considered to be an enhanced or improved variant of a general search algorithm called Best First Search.

Standard textbooks on Artificial Intelligence describe Best First Search, Breadth First Search, Depth First Search, Minimax, and other search algorithms—all of which have corresponding implementations in ODPS. In fact, any known search algorithm can be adopted to ODPS—which is one of the powerful strengths of the system.

Standard textbooks and the technical literature describe many well-known approaches and methods that can be used to search a problem space. For example, the text book, Artificial Intelligence by Elaine Rich (McGraw-Hill 1983, ISBN Number: 0-07-052261-8) herein incorporated by reference describes several of the most well-known approaches and methods that can be used to search a problem space also referred to as a tree structure. These approaches and methods include, but are not limited to, the following: generate-and-test, hill climbing, breadth-first search, depth-first search, best-first search (including the A* algorithm, agendas, and other variations and implementations), problem reduction techniques (including the AO* algorithm), back-propagation techniques, constraint satisfaction techniques (including dependency-directed backtracking), means-ends analysis, branch-and-bound techniques, nearest neighbor algorithm, divide-and conquer techniques, back-chaining techniques, minimax searches (with and without cutoffs), as well as the use of heuristic functions of various sorts. Combinations of one or more of these techniques as well as variations on these techniques may also be employed.

A point to be understood in applying a search algorithm to ODPS is to realize that the online TDG will implement the problem tree. The rewards are equivalent or proportional to the result of what is called the value returned by the "evaluation function" in computer science. And the experts themselves (and/or the customer) are the people using their human judgment to conduct the actual evaluation—in most cases. With a tree and an evaluation function, search can follow any of the well-know algorithms in computer science.

The tremendous power of ODPS derives at least in part from the fact that ODPS can coordinate simultaneously (or nearly simultaneously) the brainpower of many minds more quickly and effectively than any other method hitherto known. Any system that can focus more minds on a problem that requires multiple steps and/or multiple source of expertise, and that can do this in a shorter length of time than other systems, will result in better and faster problem solving than any known method.

A key to maximizing the potential power of the system, in the short run, derives from maximizing the speed with which the evaluation system can proceed, so that the limiting factor becomes the speed with which the individual human experts can proceed. Once human information processing becomes the limiting factor, assigning the right human beings to the right parts of the tree becomes critically important. That is, problem solving works fastest and best if you have experts working in their areas of expertise. For this reason, the matching of experts to problems and sub-problems at the beginning and throughout problem solving becomes very important.

In one aspect, embodiments of the invention provide system, method, computer program and computer program product for coordinating the activities of a plurality of people, where the plurality may be any number from two to thousands or more people.

In another aspect, the invention provides a mechanism for directing the attention and focus of large numbers of people who are solving problems using a tree-based problem space, where the tree based problem space may be a virtual problem space.

In yet another aspect, embodiments of the invention provide specific algorithms and implementations for evaluating nodes in the virtual problem space and assigning values via a pay-off matrix that serves to focus the attention of large numbers of problem solvers.

In still another aspect, embodiments of the invention provide for the use of combinations of threaded discussion groups with the pay-off matrix and a variety of algorithms from computer science to create an entirely new and highly useful system for solving multi-level problems leveraging human expertise instead of artificial intelligence as has been done previously. It will be noted that in the this aspect human experts typically provide the problem-solving expertise, but it is also possible for the ODPS system to work with a combination or human and non-human experts (such as for example, AI agents), or with only non-human experts.

In a further aspect, embodiments of the invention provide a mechanism for coordinating the problem solving activity of hundreds or thousands or more humans as opposed to the limited number of humans who can work simultaneously to solve problems in a coordinated way using existing groupware technologies such as for example Lotus Notes.

In yet another aspect, embodiments of the invention provide a mechanism and method for drawing the attention of the particular types of experts to particular places in the virtual problem space where their expertise is most needed via a database system that matches their skills (as specified in the database) to the on-going and ever-developing needs for skills of different types as reflected in the virtual problem space.

In a further aspect, embodiments of the invention provide a method for building-in rules to a threaded discussion group that effectively implement various known search algorithms and allow the implementation of newly created search algorithm, including for example the ability to specify that no more than a predetermined number of new response can be generated to any problem before the responses must be evaluated, the best one chosen, and the process repeated.

In still another aspect, embodiments of the invention provide a mechanism for incorporating peer ratings in the context of a threaded discussion group in which the peer ratings lead to a pay-off matrix, and in which the peers themselves are evaluated in terms of their credibility allowing the peer ratings to be weighted by the system as it learns more about the problem solving effectiveness of each of the peer-experts.

In an additional aspect, embodiments of the invention provide an ability to use a threaded discussion group as a virtual problem space, which maps the progress of the problem solving effort and provides a permanent, navigable record of the ideas produced together with the evaluation of each idea.

In another aspect, embodiments of the invention provide a system for bringing more minds to focus on a problem simultaneously in a coordinated way than previously existing systems.

In even still another aspect, embodiments of the invention provide a system that incorporates parameters that allows customers to easily control the problem solving effort by manipulating the values in the payoff matrix to incent behavior that meets customer needs such as quantity of ideas, quality of ideas and speed with which ideas are generated. As used here, the term "ideas" is a general term meant to encompass intellectual work products of all sorts.

In yet another aspect, embodiments of the invention provide a system for effectively limiting off-topic posts in a threaded discussion group by via manipulation of values in a pay-off matrix.

In another aspect, embodiments of the invention provide a system for combining a threaded discussion group with a synchronized clock cycle so that there is a periodic cut-off for acceptance of new ideas on a particular topic which is a parameter that can be controlled by a customer.

In another aspect, embodiments of the invention provide a system for filtering content by displaying only those posts that have higher than a certain threshold monetary values as set by the participant and/or the customers.

In another aspect, embodiments of the invention provide the ability to reward expert posters based on the degree to which their posts actually solved a problem and to use methods of assignment of blame and credit to determine the value that each post, in a long sequence of posts, contributed towards the ultimate solution of the problem.

In another aspect, embodiments of the invention provide the implementation of a virtual problem space with search control capability using threaded discussion groups and other techniques.

In still another aspect, embodiments of the invention provide system and method for posting a monetary value or other reward or compensation next to or associated with each post and of providing easy ways for users of the system to find the open problems with the most monetary value that best fit their expertise In yet another aspect, embodiments of the invention provide system and method that serve various educational, teaching, and learning needs including providing capabilities for rapid test item development, rapid scoring of constructed response and essay-types of test items, rapid association of educational content with test items/sections, rapid development of new educational content, and abilities to identify, develop, and share educational practices.

The invention provides system, method, computer program and computer program product, as well as business operating model for online distributed problem solving capabilities. One particularly useful embodiment having excellent performance involves four elements, though other embodiments may involve only a subset of fewer of these elements. The first step involves specification of the problem to be solved. This step ensures that the problem is well defined and has a clear focus with objectives and deliverables. The second step involves finding and qualifying the experts that will be working on the problem. This step increases the probability that well qualified experts who are available and able to respond quickly to the problem are included in the problem solving effort. The third step or element involves use of a virtual problem space that supports online problem solving by the experts on problems. This step allows the problem solving to take place online, quickly and effectively. The fourth step or element involves implementation of a reward system, combined with search algorithms, that serves to focus the attention and efforts of online experts as they work on a problem.

With regard to problem specification and expert qualification, ODPS is similar to other problem solving system in that if the problem is poorly specified or the experts are poorly qualified, this will have a negative impact on the solutions that are produced. On the other hand, a well-specified problem and well-qualified experts can enhance the results produced by the system.

ODPS is most effective when the online experts that participate in problem solving are directed to specific tasks that match their skills and interests. In particular, for large problem solving efforts, which involve a large virtual problem, a space with many sub-tasks, the more efficiently that experts can be directed to the relevant sub-tasks, the more efficient the overall problem solving will be.

For purposes of this description, it is assumed that the customer specifies the problem and initial sub-tasks (if any) by directly using the features of the TGD software. This is not a requirement of the invention but it simplifies the description of the invention by avoiding obscuration of inventive aspects with techniques and procedures of conventional nature known in the art. It is also assumed that online experts will be notified via email of a URL that corresponds to the task(s) that best match their qualifications. Again, this assumption is made for convenience and brevity of description and is not a limitation of the invention itself. Matching algorithms and means for qualifying experts, such as administering online questionnaires using questions that correspond to features of the customer's problem, are known in the art and not further described here. Software for conducting such qualification is commercially available from many sources including, for example from iQ Company, of Capitola, Calif.

Having thus specified the problem and notified the experts, the ODPS can then produce superior results via a virtual problem space combined with search algorithms.

Attention is now directed to detailed description of embodiments of a Virtual Problem Space Component and a Search Control Component. Recall that the virtual problem space allows experts to actually solve problems online efficiently and effectively, and that for problem solving in a VPS to be effective, there must be an algorithm that calculates the payoff matrix and evaluates the quality of the expert responses and proposed new questions. Embodiments of each of these components are described in turn.

The heart of the ODPS system is the virtual problem space that allows experts to actually solve problems online efficiently and effectively. Because, according to the theory of Human Problem Solving, all or nearly all problem-solving activity can be represented as search in a problem space, or tree structure, using a tree structure for the virtual problem space guarantees a general system that is capable of handling any sort of problem. Further, as long as the problem solution can be expressed in the form of information that can be made available online, and as long as the steps involved in solving the problem involve only manipulation of information that exists in the minds of experts and/or in other online sources, then a virtual problem space based on a tree-like structure can enable any of these sorts of problems to be solved by exchanging ideas online with no in-person, or telephone interaction being necessary.

These considerations led to the adoption of TDG technology as the fundamental component of the virtual problem space. TDG systems, as mentioned in the background section and elsewhere in the description, already incorporate a tree structure (though the features of such tree structures have been incomplete exploited). Further, they have software functions that allow individuals to read what other people have posted, to respond to these posts, and/or to start new threads of the discussion. Finally, by incorporating universal reference locator (URL) links, TDG systems have the flexibility to include templates, tables, graphics, multi-media presentations, other software programs, and every other kind of information that is accessible via the world-wide web. Together these capabilities are valuable elements of a virtual problem space. Note that although TDG may form a valuable basis, the invention is not limited to TDGs and other mechanisms that provide analogous features may readily be adopted for the inventive system and method.

Recall that some of the features and characteristics that conventional discussion groups and bulletin board systems lack included: (i) an effective mechanism for directing the attention and efforts of experts involved in a multi-step problem solving activity; (ii) an effective method for filtering information that is irrelevant to problem solving, so that concentration and focus becomes easier; and (iii) an effective method for summarizing the steps taken during problem solving so that a concise solution can be presented to complex problem.

Beginning with any one of several commercially available or public domain TDG software programs, a virtual problem space is created by adding a means of focusing the attention of expert or experts on answering a particular question or exploring a particular topic. This means can consist of or include any system, procedure, method, or technique, that motivates or facilitates motivation of users or experts to focus more attention or effort on certain branches of the problem tree than on other branches, and even to select one problem over another problem in some instances. The preferred means for ODPS is to add reward values to various branches in the hierarchical tree structure in virtual problem space. The list (or other data structure) of all or at least a subset of the reward values for all or at least a subset of the various branches in the virtual problem space tree is called a reward or payoff matrix.

The addition of the payoff or reward matrix to the hierarchical tree structure, such as may be implemented in some embodiments with the structure and method of threaded discussion groups (TDGs) provides significant capabilities not available in conventional systems or methods.

The Search Control Component is also important as for problem solving in a VPS to be effective, there must be an algorithm that calculates the payoff matrix and evaluates the quality of the expert responses and proposed new questions or topics.

The algorithm has specific steps as well as parameters, which allows the algorithm to be extremely flexible so that it can meet a wide variety of customer needs. One implementation of the algorithm includes the following steps:

1. If no payoffs have been set for the initial problem and any sub-problems the customer (or their representative) sets the payoff amounts. A problem, subproblem, or topic in the virtual problem space (VPS) that has a payoff value associated with it is called a funded topic.
2. Intervals (I) are defined either as fixed or variable periods or time or according to some set of rules or policies. After every interval (I), check the state of the virtual problem space to see if there are any new postings—either answers to questions, new questions (or sub-problems), or both.
3. If there have been no new posts, then the state of the virtual problem space is repeatedly checked (Step 2) until new postings are detected.
4. If a new post exists or is detected, then the quality (Q) of each new post is determined.
5. Determine the payout for each post based on the quality determination (Q), available funds, and optionally other rules, policies, or criteria. In one embodiment, the posts are considered in order of quality. In other embodiments, different rules may be applied in determining the order for considering posts—for example to implement various known search algorithms.
6. If funds (F) are insufficient at that time to pay for the post, optionally transfer or attempt to transfer funds from another funded topic (or other source) in the problem tree. In one embodiment, attempts to transfer funds desirably begin with topics that have no posts; and, if after transferring funds from such non-posted topics there are still insufficient funds, transfer or attempt to transfer funds from funded topics that have the lowest quality posts first. Desirably, funds are not transferred from a topic that has an equal or higher quality post awaiting payment.
7. If there are still insufficient funds after all attempted transfers, additional funds are requested from the customer.
8. Pay the experts for their posts, up to the maximum available funds.
9. Recalculate the payoff matrix taking into account any transfers of funds between topics and payouts to experts.
10. Post the new payoff matrix and payout results. Repeat the procedure from step 2 until customer or system operator terminates problem solving.

Some key parameters for this payoff algorithm are: time interval (I), quality (Q), and money or funds (F).

Time and more specifically the length of Time Interval (I), is an important parameter. The time interval can be set to range from less than one second to, minutes, hours, days or more. If the interval is short, it means that customer wants very rapid responses, and is, or may be willing, to sacrifice some quality for speed. If the interval is long, typically expected to be on the order of days or weeks, it typically means the customer wants to see lots of responses from experts before determining the quality of each response. With more responses to choose from and more input from experts, it is likely the customer will get higher quality responses and more accurate judgments of quality, but it will take more time.

Money or Funds (F) is another important parameter, and specifically, the amount of funds (F) available to payout. In general, the more money that is made available, the more expert posts that will likely be attracted. Also, it will be recognized that running low on funds means that quality posts do not get the full funding they deserve and this is de-motivating to experts. If funds are too low, problem solving may slow or halt, or not gain the attention of the best experts in the field. In a competitive environment where top experts have limited time and plentiful problem solving opportunities, a high funding level increases the chances of getting the best expertise. It also increases the chances of getting a rapid response due to the time value of money.

Quality (Q) is a third important parameter, specifically the method of determining the quality (Q) of posts. Quality can be calculated by any one or more of a number of means. For example, quality may be calculated or otherwise determined or assessed by human judgment, by automatic algorithms, or by a combination of human judgment and automatic algorithms. In many instances, it is desirable to allow a human—specifically the customer—to have the final say in quality determination, since quality ultimately translates into customer satisfaction. It will be appreciated that either automated or manual determination of quality may be implemented. Furthermore, it is expected that as artificial intelligence and neural network, or other techniques improve over time, that such automated or autonomous techniques may be used to assist in quality determination. In addition, some automated quality determination may be used to filter or rate or rank postings to reduce the burden on a final human quality determination or assessment. While a customer may wish to provide a final opinion as to quality, there are other reasons why a customer will probably not wish to exercise this final say over quality except in unusual circumstances.

There are several reasons why the customer may not wish to have the final say as to quality. First, usually the customer has posted a problem because the customer lacks the time or expertise to solve the problem him or herself. If the customer lacks expertise, then the customer may not be the best judge of the actual quality of the posts—especially if they are technical in nature. If the customer lacks time, then the customer probably does not have time to be involved in making quality judgments for every cycle of the algorithm— especially if the Interval (I) is short. Therefore, the customer will usually wish to delegate the post-by-post quality decisions, and instead exert control over the problem solving process by a more high-level allocation of funds to generally promising avenues of exploration. Second, it should be noted that involving humans directly in making every quality judgment, would limit the speed of the problem solving system.

In addition to techniques that would involve direct customer or other human involvement in determining quality, there are several methods of determining the Quality of a post without direct involvement from the customer. One of the most effective methods is to leverage the expertise of the online experts who are posting to the system. In one embodiment, this online expert based quality assessment method can be implemented as follows:

(i) Experts post responses to questions and/or raise new questions as described herein elsewhere in this description.

(ii) Experts are free to read some or desirably all the posts of some or desirably all other experts, and can rate these posts on a quality scale. This quality scale may for example include or consist of one or more dimensions depending on how much detail and what type of is desired or required. It will be appreciated by those workers having ordinary skill in the art in light of the description provided here, that there are tradeoffs as to the degree of detail provided in quality assessments or ratings. For example, provision of more detailed ratings require more time, but many existing rating scales (such as those used by ebay, ASKME.com, or the like) show it is possible to construct a simple scale that provides useful information without being burdensome to the raters.

(iii) In one embodiment of the expert based quality rating system and method, averages or other statistically based derivations of the ratings of all the experts for each post that has been rated are computed or otherwise determined. These measures derived from the raw expert ratings) can be straight averages, weighted averages, or other statistically or deterministically derived measures. If weighted averages were used, one method would be to weight the rating for the post by the overall rating of the expert who is doing the rating. This approach assumes that experts themselves have ratings that are composed of several dimensions such as customer satisfaction, or the like, as discussed above under the topic of qualifying experts.

(iv) Based on the processed quality rating (such as for example the average or weighted average rating) of each post, the inventive system and method can consider the posts in order of quality as described in the payoff matrix algorithm.

(v) In one embodiment, additional steps may optionally be taken after a problem has been solved to provide additional information as to the quality of postings made by experts or other contributors. For example, in one embodiment, after a problem has been solved, the posts should be re-evaluated (either by an algorithm, human(s), or a combination of one or more humans assisted by algorithm based automated analysis) to determine which posts made the greatest contribution to the problem solution. Then those experts who rated these posts highly should gain credibility as peer raters while those who rated these posts poorly should lose credibility as peer-raters. In subsequent ratings, the opinions of peer raters with higher credibility should be given more weight than those peer raters having lesser credibility. Desirably, peer-raters would provide expertise in particular problem areas and the credibility of a rater would be tied to their demonstrated area of expertise.

(vi) In one embodiment, usually at the customer's option, a certain sum of money or funds (or other non-monetary award) can be reserved to be paid out as bonuses to those experts whose ideas were determined to be most relevant (after the fact) to actually solving the problem.

It will be appreciated by those workers having ordinary skill in the art in light of the description provided herein that the payoff method and algorithm described herein above is only one of many different types of algorithms that can be used to determine and/or influence how to focus attention in online problem solving.

The particular algorithm which will perform the best, will in general depend upon the goals and needs of the customer, to a large extent. The customer may be interested in obtaining problem solutions under any number of different scenarios, for example: quickly, by a certain date, inexpensively, with extremely high quality, or according to other criteria or factors. Depending on the relative importance of each of these factors, parameters in the algorithm (such as the interval of time before all posts are evaluated, or total rewards offered) can be tuned to optimize the fit for the customer.

Having described features and characteristics of one embodiment of the inventive system and method for the general problem, attention is now directed to an embodiment of the invention as applied to teaching and learning in the educational field or market.

Applications of ODPS to the Education Market

In the description of embodiments of the invention so far, the description has explained the general ODPS algorithm and illustrated to how to implement ODPS using a prototype system that implemented the ODPS system for solving generic problems whose solution can be represented by an idea expressed in a paragraph of text. However it may be noted that the same ODPS algorithms can be included in more specific types of problem solving systems. This section describes five such specific ODPS sub-systems—all targeted to the education market.

State, local, and federal governments in the United States are very concerned about improving student achievement, especially in the elementary or kindergarten through high-school (K–12) grades. This concern is shared by countries outside the United States as well as by companies that serve country, state, and school administrators, educators, parents, and students.

What gets measured gets done, so student testing is becoming an increasingly important component of initiatives to improve student achievement. This focus on testing raises many problems, which can be more efficiently solved by embodiments of the inventive ODPS system and method than by currently existing systems and methods. Some of the key issues requiring or benefiting from solution include: (1) How can the many new test items that will be needed to accommodate the increased focus on student testing be rapidly developed? (2) How can constructed response ("essay type") questions be rapidly scored to allow the fastest possible turn-around of test scores to administrators, teachers, parents, and students? (3) How can existing educational content be linked to the areas where tests show students need the most help? (4) How can new educational content that addresses the areas where tests show students need the most help be rapidly developed? (5) How can best practices in education be identified, developed, and shared so as to improve or facilitate improvement in student achievement?

Rapid Test Item Development

Development and validation of educational test items conventionally takes several years and requires careful research studies and analysis to produce a relatively small number of "high stakes" test items. High-stakes test items include for example, the items used as part of scholastic achievement tests, high school exit exams, college and graduate school entrance exams, and similar standardized tests which measure student achievement. The long period of development may generally constrain the ability to improve education.

Embodiments of the inventive ODPS system and method adapted for educational or other test item development are capable of producing large quantities of high-quality "low stakes" test items which could be used immediately for "low stakes" tests, and/or fed into existing validation processes to produce a much larger quantity of "high stakes" test items. Low-stakes test items include for example, the study questions found at the end of textbooks, test items used by individual teachers in specific schools, or self-study test items used as homework or aids to learning specific material, and other items which have not been statistically normalized so as to compare the achievement of students from different populations.

One embodiment of an ODPS system and method that achieve these results is implemented as now described. Other embodiments that include some of these features or variations on these features may also or alternatively implemented.

A secure web-based virtual problem space (VPS) is established using known security measures, such as security implemented using SSL, user names and passwords, or the like and a threaded discussion group (TDG) or equivalent.

In this educational environment, the top-level problem in the VPS is to develop test items. Sub or lower level problems within the problem tree include developing specific types of test items in specific content areas for specific grade levels.

The payoff matrix reflects the needs of the customer at any given time and may be updated or modified as the needs change. For example, if due to a new contract there is a sudden need for test items covering $11^{th}$ grade American History, the payoff for developing items of this type is increased until enough high-quality items have been generated.

For simple items that have a known format, the solution to the sub-problem of generating a needed item could be accomplished in a single post. The post would link to existing forms or templates, such as for example to existing web-based item templates, which the online subject matter expert would complete. For more complicated items, or test sections that are composed of several items, several individuals might respond and create a team solution in several problem-solving (or item creation) steps. Again, some of these steps could be pre-determined. In one situation, one step might be to create the text of the question and response choices, while another step might be to create an accompanying graphic or other media or multi-media materials.

The quality of all solutions (and/or solution pieces) is subject to peer review and/or customer review using a variation of the general ODPS payoff algorithm described elsewhere herein. The customer would frequently be the final arbiter, deciding whether to accept or reject items (solutions) and adjusting the credibility of the peer experts according to their track record of recommending or rating items that are mostly accepted or mostly rejected. As a result of the feedback from peer review, problem solvers may revise their items until they pass peer muster and then submit them to the customer for final review and payment, if they are found acceptable.

A database stores information about each registered problem solver such as his or her areas of expertise, past performance as a problem solver, and credibility as a peer rater, and/or other relevant information. When a problem solver logs-on, the ODPS system identifies matches between the problem solver's qualifications and open problems. Techniques for constructing such a database-matching algorithm are known in the art and not described in greater detail here. Open problems available for solution are listed for problem solvers in order according to criteria that the problem solver might specify, for example in order of decreasing payoff, increasing payoff, most recent problems to be solved first, or other order.

Item templates and/or other authoring tools or software or computer programs or code (e.g. applets) that problem solvers might use for the specific task of authoring items would be provided via links from the specific task threads in the TDG.

Once items have been accepted by the customer, the customer is able to transfer these items into a customer database of approved items. The customer database may be a database separate from the ODPS sub-system for rapid item development or may comprise storage associated with the ODPS system. Techniques for transferring approved items from a completed item template, linked in a TDG, to a customer database are known in the art and not described in greater detail herein.

Embodiments of the ODPS sub-system for rapid item development provide significant benefits as compared to conventional systems and methods. Significant benefits of the ODPS sub-system for rapid item development include: (1) Just-in-time item development based on the immediate or near-term needs of the customer. (2) More items developed more quickly than is possible using conventional approaches to item development due to the large number of people who could be working simultaneously on item development. (3) High levels of quality control (as a result of the peer-rater system) that imposes a minimal burden on the customer. (4) Access to a far greater range of potential item experts than would be possible using conventional approaches. (5) Seven day per week, twenty-four hour per day (24×7) item development capability with worldwide experts contributing or using the system. (6) Built-in troubleshooting and item revision capabilities due to the peer review system combined with the TDG discussion capabilities and the ODPS problem solving structure.

Rapid Scoring of Constructed Response Test Items

Currently it takes at least twice as long for testing companies to score essay type questions which are also referred to as constructed response questions, as it does to score multiple-choice questions. The additional time required reflects the fact that human scorers typically read each constructed response item and then assign a score whereas computers can score multiple-choice items.

Although recently the Educational Testing Service has experimented with computer scoring of constructed response items, such systems are generally acknowledged to be inferior to human scoring. Computerized scoring systems generally must pick out key words or phrases in essay answers and assign points based on the presence of absence of these key words or phrases. In contrast, human scorers can understand the entire essay and thus can score on overall meaning—even if a particular word or phrase was not used.

Since it is generally acknowledged that the purpose of the tests is to assess knowledge—as opposed to the ability to use a word or phrase that a computer scoring system might be looking for—computerized scoring is a less than ideal solution to the problem of trying to score constructed response items more rapidly. (In the future, as techniques for scoring such constructed response items improve, the use of computer or other non-human scoring may be expected to increase.)

An ODPS system and method for scoring of constructed response items may reduce the current time required for scoring constructed response items, for example depending upon question type, improvements of 50% and more may be expected in eliminating the delay that is now caused by this type of test item without resorting to computer scoring.

An ODPS system for rapid scoring of constructed response type items is now described.

A secure web-based VPS is established using known security measures (e.g. SSL, user names & passwords) and a TDG.

In this embodiment, the top-level problem in the VPS is to score constructed response test items. Sub-problems can include scoring specific types of test items in specific content areas for specific grade levels.

The reward or payoff matrix is constructed and updated so that it reflects the scoring needs of the customer at any given time. For example, if the current need is to score essays covering the War of 1812 (in a test on American History) the payoff for scoring these essays are increased until all of the essays have been scored.

For most constructed response items, the solution to the sub-problem of scoring the item against pre-existing criteria may be accomplished in a single post. In other situations, multiple posts may be needed or if not needed, desired so as to receive additional information. The post would link to existing web-based scoring templates, which the human scorer will complete. It will be appreciated that for this embodiment of the inventive system and method, "problem solver" equates to "scorer" since the problem to be solved is one of scoring exams. Scoring of other authored materials may be accomplished in analogous manner. For complicated items, or test sections that are composed of several items, one or more individual problem solvers (scorers) may respond and score in several problem-solving (scoring) steps. Again, these steps may be to apply pre-determined scoring criteria. For example, one step in the scoring procedure may be to score the text of the question while another step may be to score a required accompanying drawing.

The quality of all solutions (scores) is subject to review, in one embodiment to peer review and/or to customer review. In some situations, it will be desirable to have multiple individuals score the same item, but this is not a requirement. If the two independent scorers agree on a score it is passed on to the customer. If there is disagreement, a sub-problem of resolving the disagreement may be established and the two scorers can for example, use the capabilities of the TDG to discuss their differences and reach consensus on a score. One of their options is to bring in additional scorers as may be necessary until a consensus, a majority, an opinion, or some other predetermined policy or rules about a correct or acceptable score is reached.

In some embodiments, the customer is the final arbiter, breaking scoring deadlocks and adjusting the credibility of the scorers according to their scoring track records or history. For example, a scorer who consistently scores differently (and incorrectly or with some bias in the eyes of the customer) from his or her peers would have a lower credibility rating, and might ultimately be eliminated from the pool of potential scorers altogether.

A database stores information about each registered scorer such as his or her areas of expertise, past performance as a scorer, credibility as a scorer, and any other information that may be useful for scoring. When a problem solver logs-on, the ODPS system identifies matches between the scorer's qualifications and open items to be scored. Database-matching algorithms and systems are known in the art and not described in greater detail herein. The open items to be scored are listed for scorers in order of decreasing payoff, or according to other criteria that the scorer might specify. In one embodiment, open items to be scored are listed in order of most recent items first, while in another embodiment they may be listed in order of the oldest items first.

Scoring templates, guidelines and/or other scoring tools or programs (such as for example in the form of computer software code or applets) that scorers might use for the specific task of scoring items would be provided via links from the specific task threads in the TDG.

Once scored items have been approved by the customer (or other approval authority), the customer (or other party) transfers these items into a customer database of approved items. The customer database may be the same or separate from the ODPS sub-system for scoring. Systems and procedures for transferring such scored items are known in the art and not described in greater detail here.

The inventive system and method for the ODPS sub-system for rapid constructed response item scoring provide may benefits and advantages over conventional systems and methods, including but not limited to: (i) higher quality scoring than could be achieved by conventional computer based techniques due to the superior comprehension ability of humans and the ability for discussion and consensus scoring in ambiguous or borderline cases; (ii) faster scoring than is conventionally possible due to the simultaneous work of many human scorers using a secure, web-enabled ODPS scoring system; and (iii) ability of the customer to set the priority of items to be scored and to control variables like speed and quality of scoring by manipulating the payoff matrix. This later feature allows flexibility in the amount of attention given to each item; and more important or more complicated items can be given more scrutiny and/or scrutinized by more than one scorer.

Linking Educational Content to Assessment Items

The purpose of student testing is ultimately to improve student achievement. Therefore a component of testing is to reveal where students need additional instruction. However the once tests scores are known, it is often a difficult and time consuming task to determine specifically which instructional materials or information would be most helpful to individual students. Because teachers typically must divide their time among many students, they are often forced by time constraints to choose instructional material geared towards the average student rather than tailored to each student's individual instructional needs. Furthermore, conventionally decisions may be made for an entire school district rather than on the basis of an individual school or class within a school.

Recognizing this problem, companies that produce student tests are interested in linking scores on their tests to specific educational content that might help students improve in the areas where the tests reveal they need help.

One proven method of matching educational content to weak test scores is to "tag" the educational content in some way so as to indicate that a particular chunk of educational content is relevant to a particular test item. A hyperlink (or other reference) can be constructed to the appropriate tags, or a search program can locate and display appropriately tagged information. For example, if a student misses a geometry problem on a general math test, a relevant passage from a geometry textbook could be recommended to the student, provided that the geometry passage was "tagged" as being related to the item that the student missed.

Unfortunately this approach of linking educational content to test items via tags (henceforth called "linking") is labor-intensive. Automated tagging approaches that search for key words in content are possible, but generally trade-off quality for speed. That is, you can tag lots of educational content using an automated system, but the material that you recommend is often not really what the student needs.

An ODPS system for linking educational content to specific test items via tags could reduce the current time required for such linking items by 50% or more, while still providing links to highly relevant educational content.

One embodiment of the ODPS system to link test items with relevant instructional content is implemented as follows:

A secure web-based VPS is established using known security measures (for example SSL, user names and passwords) and a TDG. The security measures are intended to allow identification and/or control as to who provides problem solutions and who is entitled to receive payment.

The top-level problem in the VPS is to link test items with relevant instructional content. Sub-problems can include linking specific types of test items in specific content areas for specific grade levels, schools, subjects, or the like.

The payoff matrix reflects the needs of the customer at any given time. For example, if the current need is to link instructional covering the War of 1812 to items on an American History test, then the payoff for linking this content is increased until all of the test items have instructional links. For most linking tasks, the solution to the sub-problem of linking the item to instructional content may be accomplished in a single post. The post would link to existing web-based linking templates, which the problem solver ("linker") would use to tag instructional content relevant to the test item. Available instructional content could be displayed and/or the linker could specify other relevant content that he or she might know due to his or her expertise. For complicated items, or test sections that are composed of several test items, one or more individual linkers might respond and link in several problem-solving steps. Again, these steps might be to select from pre-existing educational content or to suggest new content. Depending on the amount of instructional content desired for each test item, several linkers might tag content that they found most appropriate. The relevance value of those items tagged by several linkers could be increased, so that the most popular content was recommended first to students missing the test item. Teams of linkers, using the discussion features of the TDG may be able to generate more relevant content than linkers working individually, due to the priming of ideas that happens during a discussion. Therefore, linkers (and/or the customer) may find it advantageous to have team discussing and generating content tags for the same item.

The quality of the tags is subject to peer review and customer review. As mentioned above, it may be desirable to have multiple linkers tag for the same test item. If independent linkers disagree about whether certain content should be tagged, a sub-problem of resolving the disagreement is established and the two linkers can use the capabilities of the TDG to discuss their differences and reach consensus on what content to tag. One of their options is to bring in additional linkers as may be necessary until a consensus, or at least a majority, opinion about the correct content to be tagged is reached. The customer would be the final arbiter, breaking deadlocks and adjusting the credibility of the linkers according to their track records. For example, a linker who consistently links incorrectly (in the eyes of the customer and/or his or her peers) would have a lower credibility rating, and might ultimately be eliminated from the pool of potential linkers altogether.

A database stores information about each registered linker such as his or her areas of expertise, past performance as a linker, and credibility as a linker. When a linker logs on, the ODPS system identifies matches between the linker's qualifications and open test items to be linked to educational content. Constructing such a database-matching algorithm is something within the ordinary skill in the art and not described in further detail here. The open items to be linked would then be listed for linkers in order of decreasing payoff or according to other criteria that the linker might specify, such as for example most recent items first.

Linking templates, guidelines, lists of available content to be linked and/or other linking tools or programs that linkers might use for the specific task of linking items would be provided via links from the specific task threads in the TDG.

Once linked items had been approved by the customer or other approval authority, the customer would be able to transfer these items into a customer database of approved items, separate from the ODPS sub-system for linking.

It will be appreciated that embodiments of the invention provide numerous advantages and benefits as compared to conventional systems, methods, and techniques, including but not limited to: (i) providing higher-quality links to educational material than could be achieved by a computer due to the superior comprehension ability of humans and the ability for discussion and consensus scoring in ambiguous or borderline cases; (ii) providing faster linking than is currently possible due to the simultaneous work of many human linkers using a secure, web-enabled ODPS linking system; (iii) providing an ability of the customer to set the priority of items to be linked and to control variables like speed and quality of linking by manipulating the payoff matrix. This allows flexibility in the amount of attention given to each item. More important, or more complicated, items can be given more attention and linked to more types of educational content (perhaps by more linkers).

Rapid Development of New Educational Content

Developing instructional content is also a difficult and time-consuming task that is typically performed primarily by one (or a small number of) content author(s). Currently many educators are developing very similar instruction for the same or similar classes. Assembling new content from already developed pieces and allowing authors to focus on developing content in the areas where they have the most expertise would result in much more efficient creation of new educational content.

An ODPS system supporting the rapid development of educational content greatly improves the efficiency of the development process and results in a higher quality educational product.

One embodiment of the ODPS system to provide this functionality is implemented as now described. A secure web-based VPS is established using known security measures and a TDG or equivalent. In this embodiment, the top-level problem in the VPS is to develop a specific piece of instructional content such as a course or lecture for a particular educational use. Sub-problems include developing sub-pieces of the content—for example individual overhead slides in a lecture or lectures in an overall course. There will be sub-sub-problems and sub-sub-sub-problems down to the level of granularity where a problem can be solved by one action.

The payoff matrix for this embodiment reflects the needs of the customer at any given time. For example, if the current need is to develop instruction covering the War of 1812, then the payoff for developing this content is increased until content has been developed. Within the overall task of developing a complex piece of content (e.g. a course), the payoff matrix can reflect ongoing priorities for development of various sub-pieces. Experts can be attracted where they are needed and when they are needed by the changing payoff values that can be set by the customer, the primary content developer, an algorithm, or a combination of humans and algorithms as discussed previously.

For the simplest content development tasks, the solution to the sub-problem of developing a unit of content may occur in a single post. The post would link to existing web-based development templates, which the problem solver ("developer") would use to author the piece of content. For complicated content chunks, one or more individual developers might respond and develop in several development steps. These steps might include authoring text, creating graphics, finding references, preparing syllabi or any of a number of content development steps familiar to authors skilled in the art of developing educational content. Teams of developers, using the discussion features of the TDG may be able to generate more relevant content than developers working individually, due to the sharing of ideas that happens during a discussion. Therefore, developers (and/or the customer) may find it advantageous to have teams discussing and developing content pieces that will be assembled into a larger overall unit of instructional content.

The quality of all content developed is subject to peer review and customer review. In some embodiments, it may be desirable to have multiple developers develop alternative versions of the same content. If independent developers disagree about whether certain content pieces should be included in the larger product, they can use the capabilities of the TDG to discuss their differences and reach consensus on what content pieces to include. One of their options is to bring in additional developers as may be necessary until a consensus, or at least a majority, opinion about the correct content to be included is reached. The customer may be the final arbiter, breaking deadlocks and adjusting the credibility ratings of the developers according to their performance. For example, a developer who consistently develops poor quality content (in the eyes of the customer and/or his or her peers) would have a lower credibility rating, and might ultimately be eliminated from the pool of potential developers altogether.

A database stores information about each registered developer such as his or her areas of expertise, past performance as a developer, and credibility as a developer. When a developer logs-on, the ODPS system identifies matches between the developer's qualifications and educational content that needs to be developed. The open development jobs are then listed for developers according to a set of rules, policies, preferences, or the like.

Development templates, guidelines, list of available content pieces, and/or other development tools or programs (e.g. applets) that developers might use for the specific task of developing content would be provided via links from the specific task threads in the TDG.

Once linked items had been approved by the customer, the customer would be able to transfer these items into a customer database of approved items, separate from the ODPS sub-system for linking.

It will be appreciated that making a contribution to a problem solution is not limited only to providing a text or symbolic contribution as in written prose. Rather contribution may take virtually any form and templates and tools may be provided directly, or linked or identified in some manner such as by a hyperlink associated with the topic or node. For example, if the problem statement required developing some content item the system may display or link to additional instructive or supporting material to assist the developer in developing content that satisfies a required form. Alternatively, such information may be provided after content provided in some free-form has been selected from alternative contributions.

Embodiments of the invention of the ODPS sub-system for rapid development of educational content provide numerous advantages over conventional systems and methods, including: (i) Higher-quality content than could be achieved by individual authors working alone or in small groups due to the ability to match experts to the specific areas where they are most qualified to develop content pieces and to the ability for discussion and quality control using multiple distributed experts; (ii) faster development than is currently possible due to the simultaneous work of many human developers using a secure, web-enabled ODPS development system; (iii) an ability of the customer to set the priority of items to be developed and to control variables like speed and quality of development by manipulating the payoff matrix. This allows flexibility in the amount of attention given to each development task. More important, or more complicated, tasks are given more attention and may be worked on by more developers.

Rapid Identification, Development and Sharing of Educational Best Practices

Educators worldwide face many of the same problems. An efficient means of identifying, developing, and sharing the best solutions to educational problems would be of great value. Currently, many discussion groups, email lists, bulletin board systems, and libraries exist—all focused on best practices in education. However, none of these existing systems is designed to specifically support problem solving.

For example, in a typical discussion group, educators can raise problems and post possible solution ideas, but, as mentioned earlier, the depth of problem solving rarely reaches more than three or four levels because there is no good mechanism in the discussion group to sustain and direct problem solving through the many steps that may be needed to reach a specific solution.

Embodiments of the inventive ODPS system and method are adapted to help identify, develop, and share educational best practices more effectively than existing systems because it could draw upon worldwide expertise and because it possesses the capability to direct and sustain attention through the many steps that may be needed to adapt that expertise (e.g. a best practice) to a particular need.

These embodiments of the ODPS system and method may be implemented as now described. A secure web-based VPS is established using known security measures and a threaded discussion group (TDG) or other equivalent mechanism.

The top-level problem in the VPS is to develop a solution to a particular educational problem—for example increase the number of third graders who can read at grade level over the next year. Sub-goals and sub-problems are set by the participants as necessary during the course of problem solving.

The payoff matrix reflects the needs of the customer and the state of the problem solving progress at any given time. For example, if the participants rate choosing the right instructional materials as one of the most promising next steps to solve the overall problem of increasing third grade literacy, then this sub-problem will have a high payoff associated with it. This high payoff will in turn attract more experts to this particular branch of the VPS and focus attention and effort here. Thus experts can be attracted where they are needed, and when they are needed, by the changing payoff values that can be set by the customer, the primary content developer, an algorithm, or a combination of humans and algorithms as discussed previously.

For the simplest educational problems, the solution may consist of a single post, for example a pointer to the URL of an already existing best practice in education. However for more complex problems, several individuals might respond, generating alternative next steps and working together to solve the problem in several problem solving steps. These steps might include a wide variety of activities including posting ideas, conducting research on the web, referencing other materials, or contacting other experts. Teams of problem solvers, using the asynchronous discussion features of the TDG will be able to generate more relevant solution ideas than developers working individually, due to the sharing of ideas that happens during a discussion and the fact that many minds are working on the problem with different expertise.

The quality of all solutions (and solution ideas) is subject to peer review and customer review. Typically multiple problem solvers will develop alternative next steps at each stage of the problem solving effort. The payoff matrix is adjusted to focus attention on one or more of these next steps as the most promising for further exploration. Independent problem solvers can debate the merits of each other's solutions ideas using the capabilities of the TDG. The customer is the final arbiter of the quality of the solution produced. Problem solvers who consistently suggest poorly rated solution ideas (in the eyes of the customer and/or his or her peers) would have a lower credibility rating, and might ultimately be eliminated from the pool of potential problem solvers altogether.

A database stores information about each registered problem solver such as his or her areas of expertise, past performance, and credibility. When a problem solver logs-on, the ODPS system identifies matches between the problem solver's qualifications and the problem that needs to be solved. The open problems are then listed for problem solvers in order of decreasing payoff or according to other criteria that the problem solver might specify (such as most recent items first).

Problem solving templates, guidelines, list of available resources and contacts, and/or other problem solving tools or programs (e.g. applets) that problem solvers might use for the specific task of identifying, developing, and sharing best practices would be provided via links from the specific task threads in the TDG. For example, with respect to sharing the solutions, one sub-problem would be to index the solutions so that other educators could easily access the solutions once they were moved into the sharing database as described below.

Once solutions had been approved by the customer, the customer would be able to transfer these solutions into a "sharing database" of approved solutions, separate from the ODPS sub-system for the identification and development of best practices. The sharing database of solved educational problems would be made accessible to educators.

The benefits and advantages provided by this embodiment of the invention of the ODPS sub-system for identification, development, and sharing of educational best practices include, but are not limited to, the following: (i) identification and development of higher-quality best practices than could be achieved by individuals working alone or in small groups due to the ability to match experts to the specific problems, due to the world-wide reach of the system, and due to the peer review problem-solving process which ensures high levels of quality; (ii) faster identification and development than is currently possible due to the simultaneous work of many human problem solvers using a secure, web-enabled ODPS system; (iii) an ability of the customer to set the priority of problems to be solved and to control variables like speed and quality of solutions by manipulating the payoff matrix. This allows flexibility in the amount of attention given to each problem task. More important, or more complicated, tasks are given more attention and may be worked on by more problem solvers.

Embodiment of an ODPS System

Figure 5:
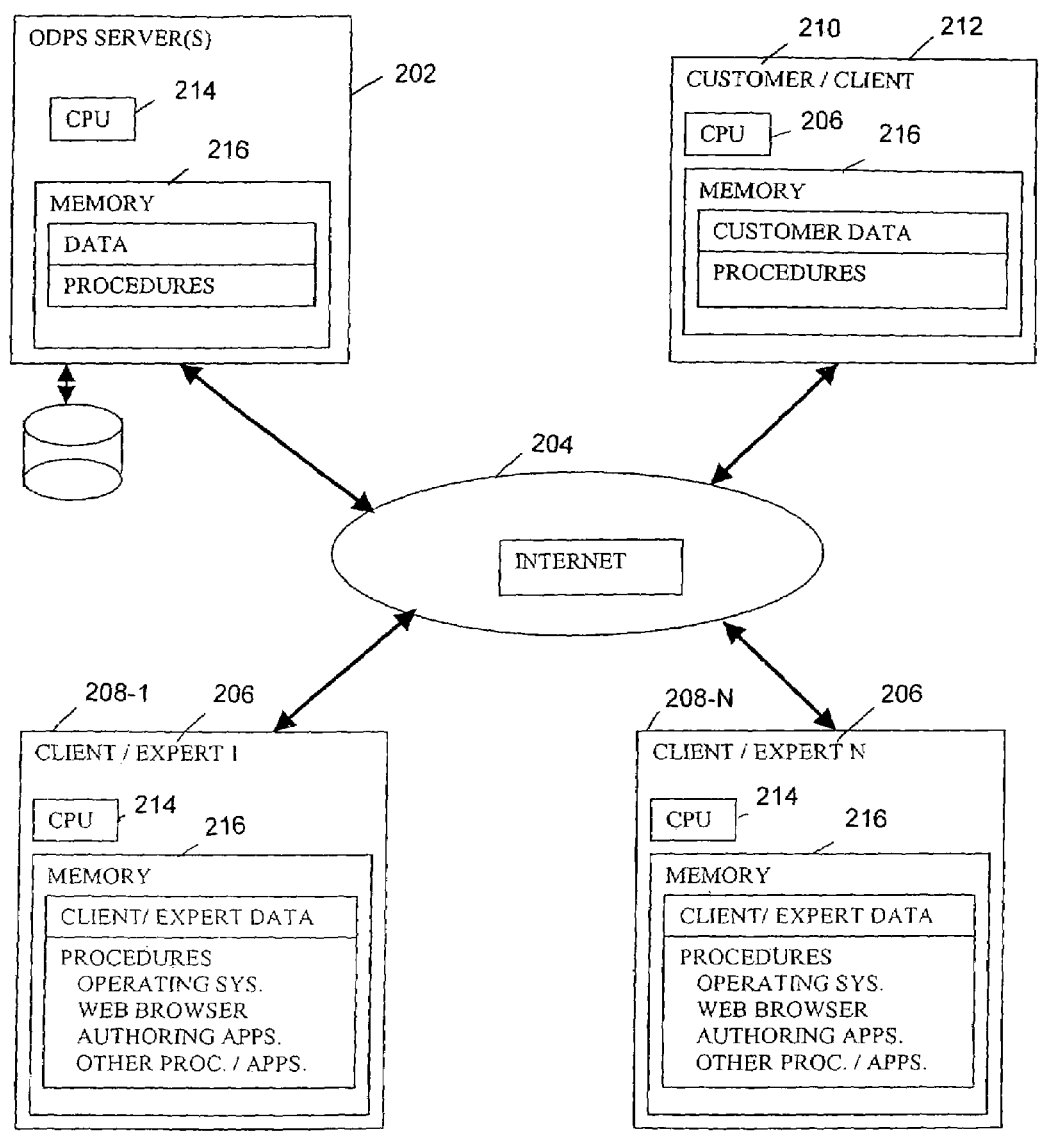
FIG. 5 is a diagrammatic illustration showing an embodiment of a system according to an embodiment of the invention.

With reference to FIG. 5 there is now described an embodiment of the inventive system for implementing an ODPS system. In this embodiment, an ODPS server 202 is coupled to the internet 204 in conventional manner. Experts 206 may also connect to the ODPS server 202 from a client computer 208 via the internet. Internet connectivity using conventional browsers are preferred as it permits a maximum number of contributors or experts to access available open problems and post contributions or solutions to such problems without requiring specialized application software. It is also possible for the ODPS server to send specialized software to any contributor or expert on a client device 208. Customers 210, such as entities that post a problem for solution may also connect to the ODPS server via the Internet, though direct dial up or any other connection may be provided. In one embodiment, the customer operates the ODPS server and therefore separate access is not required. The entire system may alternatively be operated as an intranet, such as for example where a company or other organization operates it for their own internal purposes. One example would be for a Department of Defense or other secure application.

Most likely the customer would connect to the system in a similar way to the experts—i.e. via browser, only using different software with strong security. This time, instead of the e-business software paying out money to experts for their work, the e-business software would be billing customers for the work. Again, the customers would be able to access their account via browser, but the account management software may typically reside on the ODPS server(s).

In one embodiment, the ODPS server(s) 202 provide a powerful set of web servers, connected to databases that run: (1) the threaded discussion group software/databases (TDGs) that contain the ongoing problem solving work; (2) the e-business software that handles payments of experts and billing of customers; (3) the ODPS problem database and expertise database and the software that matches experts to problems; (4) the procedures and software that runs the reward or payoff matrix and all the other functions of the ODPS system; (5) the authoring tools and/or other specific problem solving tools and templates that might be needed by experts (accessible via a browser); and (6) operating systems and other software that the above software might rely upon.

Each of ODPS server 202, expert client computer 208, and customer computer 212 is of conventional type having a processor or CPU 214, memory 216 coupled with the processor or CPU 214, and possibly various input/output and peripheral devices 218, such as for example display screen, keyboard, mouse or pointing device, hard disk drive or other mass storage devices, printers, and the like, as are known in the art. ODPS server 202 will also have mass storage such as may be provided by a hard disk drive or array of hard disk drives, either of which may be part of the server or provided as network attached storage. It will also be appreciated that although one ODPS server is specifically shown, multiple servers may conveniently be provided for additional capacity or redundancy, and such may be collocated or geographically dispersed.

Each of the server 202, expert 206, and customer 210 computers will have certain data and procedures appropriate for authoring content (problems or contributions to problem solutions) as well as administrative tasks. These data and procedures may typically be stored on hard disk drives or other local storage as is known in the art.

The ODPS server 202 may for example provide procedures in the form of computer software programs for an operating system 220, TDG software 222, Authoring software applications 224, e-business application software 226 including for example account management software 228. The server 202 may also include a browser so that it may interact as a client when required for normal access or for trouble shooting and debugging.

It is noted that authoring procedures, tools, and /or software may reside on the client machines and/or on the server, and that when needed may be communicated from the server to the client computers used by experts when needed via browser using known techniques, such as for example, using SERVLET technology and methods. Alternatively, an authoring tool (for example, an applet) may be downloaded to the expert's browser. Either or both implementations may be used. Also e-business software of some kind would desirably and advantageously be provided on the server to pay, reward, or otherwise compensate the experts for their work. This software advantageously includes account management software so that experts could review their accounts, see how much they have earned, look at their credibility ratings, input or revise their qualifications, and other administrative functions. In one embodiment, all of these functions would reside on the server with the experts accessing via a browser. However, other embodiments may provide that certain of these components would be downloaded to the experts' browsers, such as through the use of applets, for reasons of efficiency.

Each expert client 208 computer 206 which may take the form of any type of conventional computer or information appliance may also store data and procedures in the form of computer software programs. In general such expert machine 208 will provide an operating system 232, a web browser such as internet explorer or other network browser, authoring applications or tools such as conventional word processing applications or specialized applications made available for interacting with the ODPS system 200.

Each customer 210 computer 212 may be similar to or the same as any other expert client machine, particularly where any customer specific applications are provided on the ODPS server rather than on the customer machine. Any customer specific applications may alternatively be provided on the customer machine 212 if desired.

Most likely the customer would connect to the system in a similar way to the experts—i.e. via browser, only possibly using different software with strong or stronger security. This time, instead of the e-business software paying out money to experts for their work, the e-business software would be billing customers for the work. Again, the customers would be able to access their account via browser, but the account management software may typically reside on the ODPS server(s).

Figure 6:
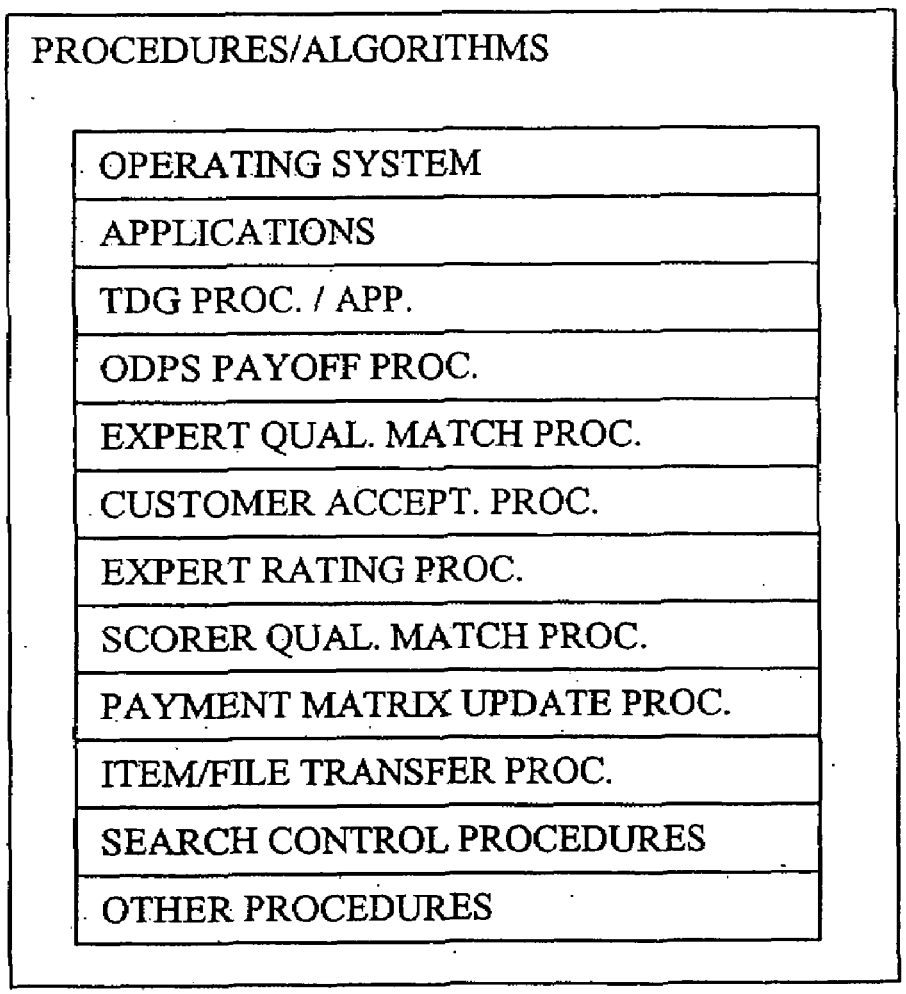
FIG. 6 is a diagrammatic illustration showing an embodiment of memory or storage contents data according to an embodiment of the invention.

Those workers having ordinary skill in the art will appreciate that software and/or data may be stored in one or both of OPDS server 202 and client (expert or customer) 208, 212 depending upon the implementation desired. With reference to FIG. 6, elements of data that are advantageously provided and stored for at least one of the afore described ODPS system applications are now described. It is noted that only a subset of these data and procedures are needed for particular ones of the applications described herein.

In one embodiment, the ODPS server 202 would store data either in memory during use of the particular data or more usually in a mass storage device such as a hard disk drive or disk drive array. Data components 240 may include: a problem tree 242; reward or payoff matrix and matrix values 244; registered experts 246 (including for example one or more of registered problem solvers, registered scorers, registered content linkers, registered content developers, or other registered experts for other or different fields); templates, forms, or tools 248; expert matching procedure data 250 for matching experts or contributors with different open problem sets or other available tasks (such as for example scorer qualification matching procedures); reward or payoff matrix data 252; item or file transfer data 254; expert and customer account information 256; problem description and status data 258; problem solution data 260; work-in-progress associated with problem tree nodes 262; expert qualification data 264; and other data that may be needed or desired to support one of more of the inventive ODPS features.

Figure 7:
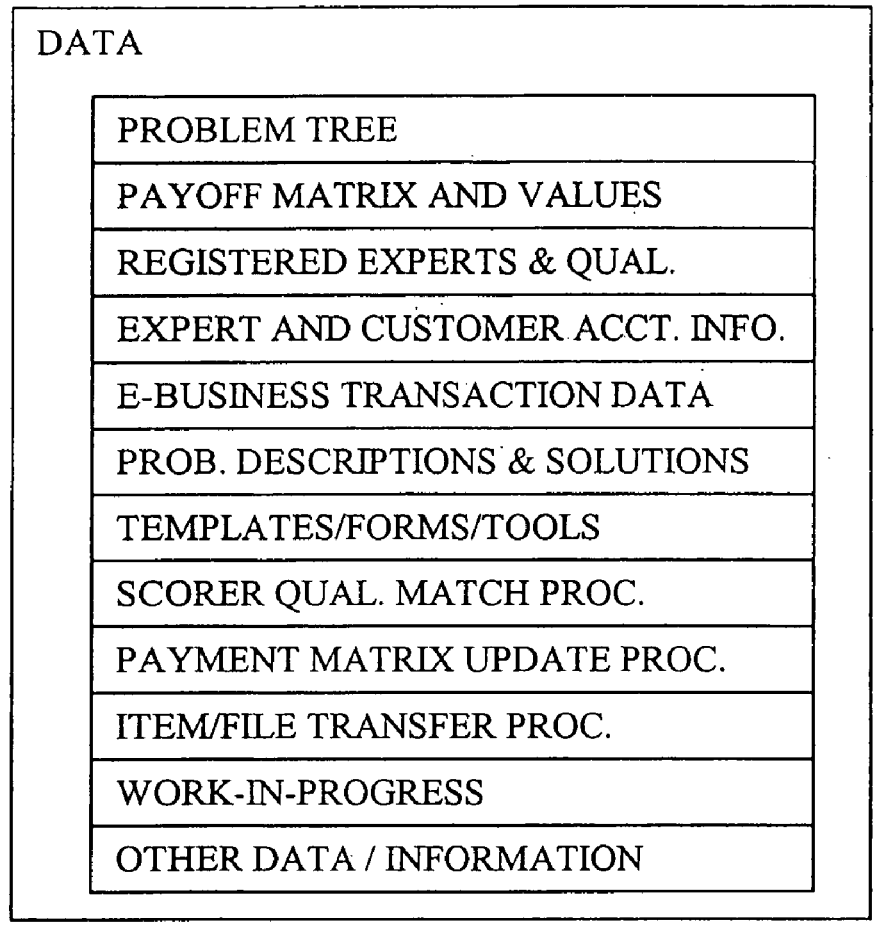
FIG. 7 is a diagrammatic illustration showing an embodiment of memory or storage contents procedures and algorithms according to an embodiment of the invention.

With reference to FIG. 7, there are illustrated some exemplary procedures and algorithms that may be used for or in conjunction with the inventive system and method. These procedures may advantageously be implemented as computer programs and computer program products. Such computer program products may be stored on tangible media such as floppy-disk or CD-ROM or communicated electronically and stored by the sender or receiver within solid state memory, hard disk drive, or other means.

Procedures and algorithms 270 implemented in computer program software, firmware, or other means may for example include: an operating system 272, various application programs 274, a TDG procedure application 276, an ODPS payoff procedure 278, an expert qualification to problem matching procedure 280, an expert rating procedure 282, a reward of payout matrix update procedure 284, and item or file transfer procedure 286, one or more search procedures 288, and other procedures 290 as may be desired or required to implement particular features or capabilities of the OPDS system and method.

It is noted that the various procedures shown in the diagram include many procedures for a variety of different applications and that for any particular application many of these procedures would not be used and are optional. For example, in an ODPS system designed and implemented for developing test items procedures for scoring test items or tools for other specific types of problem-solving would not be required.

Other Exemplary Applications

It will be appreciated that the inventive ODPS is applicable to solving a great variety of problems, and that in particular it is applicable to solving problems in the educational field such as the development of educational content and assessment test items, scoring assessment items and resolving scoring conflicts, solving specific educational problems related to improving student achievement and identifying, developing, and sharing educational best practice, as described above.

Other areas of applicability are now described by way of example but not by way of limitation. ODPS may be used for solving traditional consulting problems such as management and strategic consulting problems, logistical problems, marketing problems, financial problems, human resource problems, manufacturing problems, and other similar of problems whose solutions consists of ideas, reports, or other deliverables that are knowledge products.

It may also be applied to solving humanitarian and charitable problems that may require the coordination of large numbers of people, ideas, and resources.

Another applicable field is to address design problems such as the design of web sites, software, technology, or other products whose design can be broken into parts that can be worked on by more than one person simultaneously.

Military and government applications also benefit from the inventive ODPS system and method including solving military and organizational strategy problems, problems related to improving efficiency, problems related to large-scale coordination of personnel and resources, simulation problems, problems related to war games, and other similar problems.

Games and simulations such as chess, checkers, Go, and other common games as well as multi-player computer-based games, and other types of games or entertainment that may require input from or the coordination of large numbers of players, are another field of applicability.

ODPS may also be applied to information sharing and communication problems and situation involving large numbers of people who desire to get the right information at the right level of detail to meet specific individual informational needs and overall goals. Decision support problems represent a specific class of information sharing and communication problems that could especially benefit from the ODPS approach.

Modeling problems in which economic models, environmental models, or other sorts of models requiring input and/or coordination of large numbers of people may be involved are yet another area of applicability.

Having described some of the disadvantages and limitations of conventional problem solving approaches, as well as various embodiments of the invention it will be apparent that the invention overcomes many of the problems or limitations. A brief explanation is set forth below as to how embodiments and/or features of the inventive ODPS system, method, and computer program and computer program product overcome particular ones of such conventional problems and limitations.

The first major disadvantages of existing TDGs and other online tools is that even if they are accessible by large numbers of experts, they cannot readily support complex, multi-step problem solving. In particular, discussions in existing TDG systems rarely go more than three or four levels deep into the tree. An example of three levels is: A first person raise a topic, a second person comment on the first person's topic, and then the first person comment on the second person's comment. Theoretically there could be comments on each other comments indefinitely. However in practice, discussions rarely get more than three or four deep because the posters of the topic or comment lose interest or someone posts a new top-level comment.

In other words, it is difficult for existing TDGs to sustain the focused attention necessary to explore a topic further than three or four levels deep. The relatively shallow exploration of topics that occurs with traditional TDGs means that TDGs have traditionally been used to handle only very simple problems (that is simple question and answer type problems) that require only about two or three levels of depth per topic. Unfortunately this excludes a large number of problems that require deeper exploration in order to find a good or complete solution.

ODPS overcomes this limitation incorporating a mechanism for directing and focusing the attention of experts and others attempting to provide problem solutions. In a regular TDG, some experts may respond to a question, but the probability that you would get continued responses to a series of questions decreases with the number of questions (i.e. with the required depth of topic exploration). With ODPS, because experts are focused on payoffs (see description of payoffs elsewhere in this document) for responding to various questions, a customer posing the problem for solution can keep expert attention for as many solution steps as are needed. Not only that, customers can switch expert attention easily and quickly by simply changing the parameters or structure of a payoff matrix associated with questions posted to the TDG.

The second major disadvantage of existing TDGs is that they do a poor job of integrating the work of multiple experts—especially if these experts do not know each other, and have never worked together before. TDGs are typically a "free-for-all" where anybody can bring up any topic that interests him or her. Some TDGs may concentrate in a narrower area but still questions may be rather freely posed. This lack of goal-directed focus means that it is extremely difficult to coordinate efforts of multiple experts. If the experts don't know each other, then they share even less of a common context, and coordination becomes that much more difficult.

ODPS provides a clear and simple method for telling experts what is important in a problem. As experts answer questions and raise new questions, the system provides feedback about which answers and new questions merit reward. This feedback, is a very simple, elegant, and effective way to encourage experts to work together along lines that the system has determined are most likely to lead to a problem solution. Experts need only "follow the money" or other reward and the search algorithm that controls the reward or payoff matrix values ensures that progress is being made. Integration, summarization, and other tasks that arise during the course of problem solving can be incented by the system and accomplished by the experts at the appropriate times. The capability of ODPS to direct experts to problems that match their expertise further increases the efficiency of integrating work from several experts.

A third major limitation of existing TDGs and other forms of offline and online problem solving is that communication and coordination problems increase and quickly become intractable as the number of participants increases. ODPS solves the problem of communication and coordination of many experts in a way that is similar to the way a free market works. For example, in the stock market, no computer program or organizational structure could possible coordinate all the research, buying, and selling activities that take place every day by huge numbers of people. Instead, the market simply sets a price, and the individuals are free to respond to the price as they see fit. If more choose to respond by selling, the price drops. If more choose to buy, the price increases until equilibrium is reached. Many complex activities are driven by a very simple mechanism.

Similarly, with ODPS, the system does not force any one expert to respond to a problem at a particular time. But because large number of experts are involved, and because the incentives for working on particular problem solving paths are changing dynamically based on the actions of all the other experts (e.g. the progress being made on the problem and the ongoing evaluation of this progress), statistically speaking, the right expertise ends up going where it is needed at any moment in time to make progress on the problem. This approach to problem solving bypasses the usual problems of coordinating specific experts, because each individual is free to contribute as he or she feels at any moment. The net result is equivalent to what would be achieved if large numbers of experts worked together in a coordinated fashion—but none of the headaches involved with trying to coordinate the behavior of individual people are involved. The key point to remember is that ODPS cares about getting the right ideas to the place they are needed to make progress on the problem. ODPS does not care which expert provides the idea, and thus ODPS is not bound by the same limitations as conventional approaches to problem solving which quickly get mired in the inherent difficulties of trying to coordinate communication and work between specific individuals working on a team. ODPS is a market approach—not a team approach—to problem solving.

A brief description as to how the inventive ODPS system and method overcomes specific disadvantages or limitations of existing TDGs or other problem solving tools now follows. (The traditional limitations are in italics and an embodiment of the ODPS approach in normal non-italic font.)

(1) Problem: Discussions frequently get off track as people express tangential opinions. Solution: With ODPS, tangential opinions and off-track comments are not rewarded, so experts tend to ignore them and focus on goal-oriented discussion, which is rewarded.

(2) Problem: The amount of information displayed can quickly become overwhelming and takes too long to read. With ODPS, experts can focus on those problem posts that have been validated by receiving rewards. If further filtering is required, ODPS supports displaying only posts above a certain dollar value, or only from highly rated experts. ODPS also directs experts to the portion of the virtual problem space that best matches their expertise, thus presenting them with the most relevant information first.

(3) Problem: People often post repetitive information, which is inefficient and adds to the burden of others trying to find new relevant information. Solution: ODPS does not pay for repetitive information, so there is an incentive to read what others have posted, and avoid duplication. In the long run, this reduces the amount of clutter for all experts and makes problem solving more efficient.

(4) Problem: People with problems have no way of ensuring that online experts will check the bulletin board in time for the answers to be useful to them. Similarly, experts trying to build off of other experts' work don't know how long they will have to wait before they can proceed. Solution: ODPS does not enforce response from specific experts within specific timeframes. This approach leads to coordination difficulties and scales very poorly. Rather, ODPS relies on market factors to incent fast response. Specifically, if two experts respond with essentially the same information, the first expert to respond (as measured by the time and date stamp of the post) is rewarded, while the response from the second expert is considered a repetitive post. With large numbers of experts, customers can have very good control over the pace of problem solving by manipulating parameters of the ODPS system such as the value of the rewards. Higher rewards lead to faster response times as experts rush to post their responses before some other expert scoops them. For a problem with above average rewards, experts know that there will be above average response times, which encourages them to check in with the system often if they wish to share in the rewards. More modest rewards tend to lead to slower response times as a natural consequence of the fact that experts are less willing to adapt their schedules to work on the problem. Thus no overt control need be exerted, but market forces act very effectively to ensure rapid response if rewards are sufficient.

(5) Problem: The likelihood of solving a problem tends to decrease multiplicatively with the number of information exchanges required to solve the problem. Solution: The problems of distracting posts and off-track ideas do not divert the attention of ODPS experts because rewards keep them on track, even over the course of many problem solving steps and topics. Thus, the likelihood of solving problems is a function of the rewards for each step, not the number of steps involved.

(6) Problem: The likelihood of solving a problem tends to decrease multiplicatively with the number of experts required to solve the problem. Solution: Because ODPS does not have the coordination problems typically involved with large numbers of experts, it actually becomes easier, rather than harder, to solve problems the more people that are involved. This counter-intuitive result, which runs against conventional wisdom concerning group problem solving, reflects the fact that more experts increases the likelihood that one will be available with the correct piece of information at any given moment in time. Since the activities of the experts are governed by market forces, rather than by overt control strategies, ODPS does not pay the traditional performance penalty for large group size that all conventional approaches pay. More experts mean more expertise, delivered more quickly with no exponential increase in coordination difficulties.

(7) Problem: Misinformation can be spread by the system because there is no efficient method for controlling the quality and accuracy of the information posted by experts. In particular, rating systems from the question posters, which have been employed by some online information exchanges, have limited effectiveness at quality control because the very fact that the questioner is asking a question suggests that the questioner lacks a particular type of expertise—that, after all, is why she or he is asking the question. Solution: ODPS uses a peer rating system that asks experts to evaluate their own posts, as well as the posts of other experts. Even though some experts may inflate ratings of their own contributions, on average, the ratings that most experts agree are superior will receive a higher rating. This method, combined with safeguards designed to avoid cheating and to ensure that the customer's values and needs are being met, allows problem solving progress to be evaluated by those who have the expertise needed to make good judgments. Unlike slashdot-.org or other discussion board systems with peer-rating systems, ODPS systems have clear criteria for what constitute helpful posts—namely those posts that solve—or help solve—the problem are helpful. Those that don't contribute to the solution are noise. Using "problem solution" as the criteria of excellence allows the raters themselves to be evaluated based on how highly they rated the posts that ended up solving the problem. Poor quality posts, misinformation, and experts that do a poor job of rating the posts of others can be quickly recognized and eliminated using this approach.

(8) Problem: A large quantity of time is typically required of a SYSOP or other human moderator in order to ensure that the local rules of TDG are followed, and in order to organize and trim the tree structure so that the information exchange remains usable. Solution: Experts who post clear and concise information that is accurate, timely, and of high quality, earn the most positive ratings from their peers and the highest rewards from the customer. Thus, the market forces, combined with the good judgment of the expert community, act together to organize and trim information. Organized information is simply more highly rated and therefore more valuable. Again, the market, and the collective actions of many individuals replace the work that is done in conventional systems by a single individual. This collective rating approach has been validated by slashdot-.org for reducing "noise" in discussion systems, but prior to ODPS, it has not been used to guide search through many levels of a tree structure in order to solve problems.

The inventive ODPS therefore provides superior performance as compared to existing systems, technologies, and methods.

One of the most powerful features of the online distributed problem solving system is that many minds can work simultaneously, in parallel on a problem, and that problem solving can proceed theoretically as fast as new posts are received. This means that the system can solve problems many times faster than real-world experts.

For example, if ten experts spend 15 minutes posting to the system in an hour, this is equivalent to 2.5 experts. Now it is possible for 2.5 experts to work together offline for an hour and probably they would achieve comparable if not superior results to ODPS. But now imagine that 10,000 experts spend 15 minutes posting to the system. This is equivalent to the brainpower of 2,500 experts concentrating on a problem for an hour. It is impossible to coordinate this many experts offline in a single hour, but online, ODPS can do it.

Even assuming a 90% loss of efficiency (which is much higher than might reasonably be expected), the 10,000 experts would still translate into the equivalent of 250 experts focused intently on solving a problem for an hour, working together, building off each other's ideas. This is a situation that is simply impossible in the offline world. This means that in terms of expertise delivered per unit of time, it will be in practical terms, virtually impossible to beat ODPS by any known offline method. Since competitive advantage, innovation, and in fact most sources of new value are now created via intellectual activities, and since the people who arrive at the new ideas first have a tremendous advantage, ODPS becomes very valuable.

The inventive ODPS system and method therefore represent a new way of conducting online problem solving of problems that require multiple steps and/or multiple experts, though it may clearly also be used with simple problems as well. A key feature is the combination a tree structure, such as is readily available in TDG software, with a mechanism to direct search through the tree—the payoff matrix and search algorithms discussed elsewhere herein. When search through a virtual problem space is combined with a system for matching many experts simultaneously to problems and sub-problems where they have expertise, rapid and effective problem solving surpassing anything previously obtainable via any hitherto known system is possible. The disadvantages that stem from coordinating large numbers of individuals are replaced by the advantages that accrue from a market system, free from exponentially increasing coordination and communication problems, that performs better and better as more experts are involved.

Figure 8:
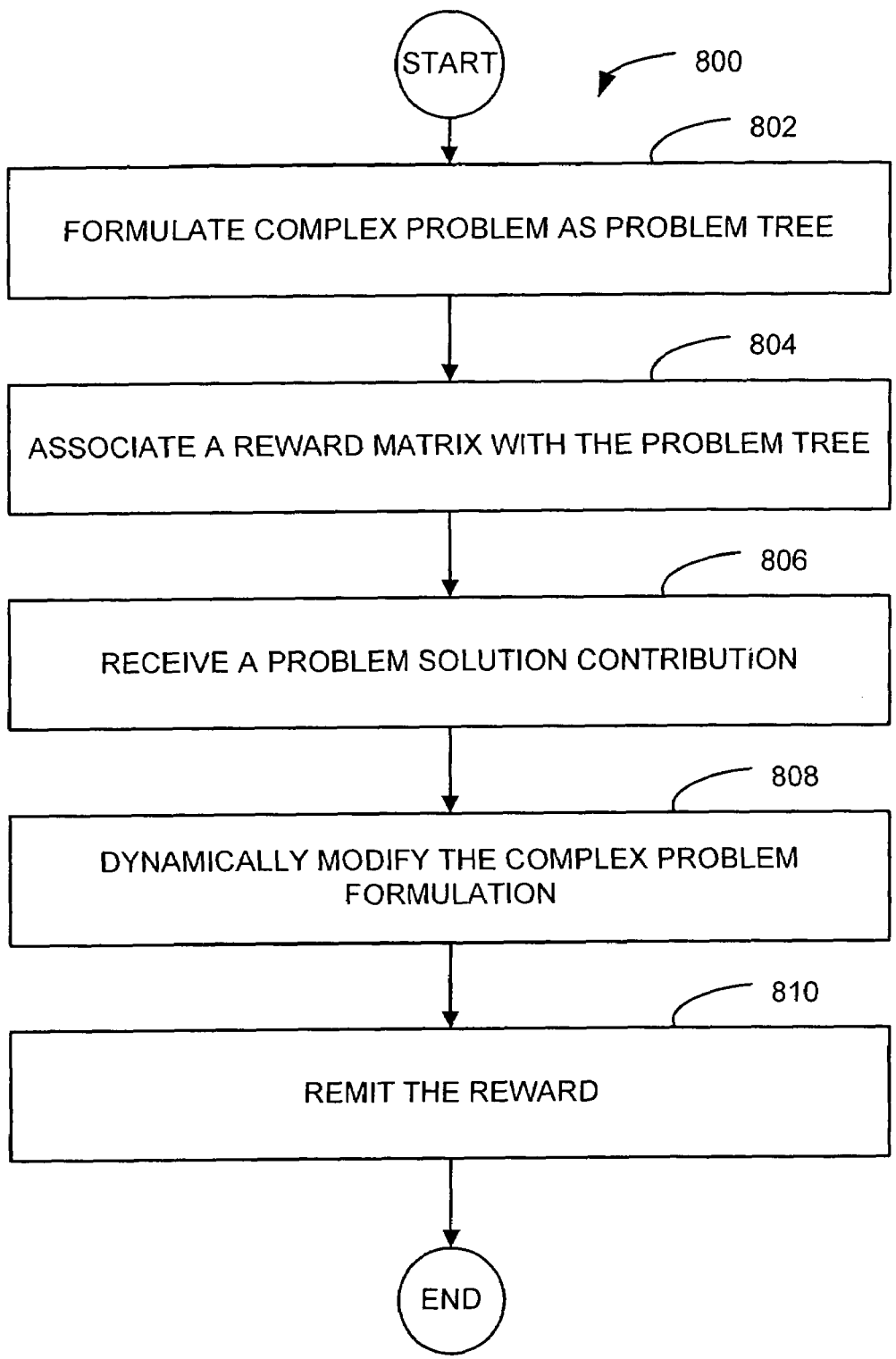
FIG. 8 is a diagrammatic illustration showing a flowchart of an embodiment of a method for solving a complex problem by a plurality of problem solving contributors acting asynchronously over an interactive communication medium according to the invention.

FIG. 8 depicts a flowchart 800 of an example of a method for solving a complex problem by a plurality of problem solving contributors acting asynchronously over an interactive communication medium. In the example of FIG. 8, the flowchart begins at module 802 where a complex problem to be solved as a problem tree having a plurality of problem nodes and problem braches coupling the problem nodes is formulated. In the example of FIG. 8, each of the plurality of problem nodes comprises either a sub-problem or a solution or partial solution to a sub-problem. Further, contributions to the sub-problem or solutions or partial solutions to the sub-problems contribute to solution of the complex problem.

In the example of FIG. 8, the flowchart 800 continues at module 804 where a reward matrix is associated with the problem tree having reward values identified with at least some of the sub-problems. In the example of FIG. 8, each reward value comprises a reward that will be remitted to a problem solution contributor for making a problem solving contribution associated with at least one of the sub-problems.

In the example of FIG. 8, the flowchart 800 continues at module 806 where a problem solution contribution to a particular one of the sub-problems from a particular problem solving contributor is received. The example of FIG. 8 continues at module 808 where the complex problem formulation is dynamically modified during its solution is response to at least on received problem solution contribution. In the example of FIG. 8, the dynamically modifying the complex problem formulation comprises a contributor formulating and presenting at least one new sub-problem to be solved in response to problem solution contributions submitted.

In the example of FIG. 8, the flowchart continues at module 810 where the reward or a portion of the reward associated with the particular one of the sub-problems to the particular problem solving contributor is remitted.

While the present invention has been described with reference to a few specific embodiments and examples, the description and the particular embodiments described are illustrative of the invention and is not to be construed as limiting the invention. Various modifications may occur to those skilled in the art without departing from the true spirit and scope of the invention as defined by the description and the appended claims. All patents and publications referenced herein are hereby incorporated by reference.

I claim:

1. A method for solving a complex problem by a plurality of problem solving contributors acting asynchronously over an interactive communication medium, said method comprising:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;

associating a reward matrix with said problem tree having reward values identified with at least some of said sub-problems, each reward value comprising a reward that will be remitted to a problem solution contributor for making a problem solving contribution associated with at least one of said sub-problems;

receiving a problem solution contribution to a particular one of the sub-problems from a particular problem solving contributor;

dynamically modifying the complex problem formulation during its solution in response to at least one received problem solution contribution, the dynamically modifying the complex problem formulation comprises a contributor formulating and presenting at least one new sub-problem to be solved in response to problem solution contributions submitted; and remitting the reward or a portion of the reward associated with the particular one of the sub-problems to the particular problem solving contributor.

2. The method in claim 1, wherein the reward matrix comprises a payoff matrix and the reward values comprise monetary reward values.

3. The method in claim 2, wherein the monetary reward values are reward values in a recognized international currency.

4. The method in claim 3, wherein the recognized international currency is selected from the set consisting of United States Dollars, Japanese Yen, French Francs, Canadian Dollars, European Currency (EU), and English Pounds.

5. The method in claim 1, wherein in response to the receipt of a problem solution contribution to a particular one of the sub-problems from a particular problem solving contributor, the method further includes dynamically modifying the reward matrix to alter the incentive to provide problem solving contributions in response to the receipt of problem contributions to one or more of the sub-problems.

6. A method according to claim 5, wherein the act of modifying the reward matrix is performed at least in part by at least one problem solving contributor of the plurality of contributors.

7. The method in claim 1, wherein the reward matrix and the reward values of the reward matrix are selected to preferentially encourage problem solving contributions to particular ones of the sub-problems having particular more valuable reward values.

8. The method in claim 1, wherein said contributors access the problem tree and the reward matrix over a network communication medium.

9. The method in claim 1, wherein said contributors access the problem tree and the reward matrix via a threaded discussion group over the internet.

10. The method in claim 1, wherein the plurality of contributors comprise at least ten contributors.

11. The method in claim 1, wherein the plurality of contributors comprise at least one hundred contributors.

12. The method in claim 1, wherein the method further comprises matching skills of possible contributors to an existing problem tree or sub-problem.

13. The method in claim 1, wherein the matching includes comparing a database of expert contributors to all problems trees, or sub-problems for which solutions are sought.

14. The method in claim 1, further comprising detecting the occurrence or nonoccurrence of a predetermined condition or event and modifying the manner in which problem solution contributions are processed in response to identified ones of said predetermined conditions or events.

15. The method in claim 1, further comprising evaluating submitted contributions after a predetermined number of contributions have been submitted before permitting additional contributions to be submitted.

16. The method in claim 1, further comprising rating the problem solution contributions.

17. The method in claim 16, wherein the rating is done by at least one peer using a rating selected from the set consisting of:
  (i) by a peer of the expert contributor;
  (ii) by a peer of the expert contributor using any tree-based structure;
  (iii) by a peer of the expert contributor using a threaded discussion group based tree-based structure;
  (iv) by peer members in terms of their credibility; and
  (v) by peer members of a threaded discussion group in which the peers themselves are evaluated in terms of their credibility.

18. The method in claim 17, further comprising rating the problem solution contributions by peer members of a threaded discussion group in which the peers themselves are evaluated in terms of their credibility, and wherein the peer ratings are analyzed and allocated a weighing based in part on historical performance and the demonstrated problem solving effectiveness of each peer-expert contributor.

19. The method in claim 16, wherein said problem solution contributions are rated for quality and the reward matrix reward values are modified to reflect the quality of the contribution.

20. The method in claim 19, wherein a more valuable reward value is allocated to a more highly rated problem solution contribution.

21. The method in claim 1, wherein method further comprising generating a record of a problem solution effort toward a final solution and generating a record of the ideas produced and an associated evaluation of each idea produced.

22. The method in claim 1, wherein method further comprises generating a record of a problem solution effort and assigning credit or blame for portions of the problem solution based on the record.

23. The method in claim 1, wherein the problem tree may be modified by a customer to control the problem solving effort.

24. The method in claim 1, wherein the reward matrix may be modified by a customer to control the problem solving effort.

25. The method in claim 1, wherein the problem tree and the reward matrix may be modified by a customer to control the problem solving effort.

26. The method in claim 1, wherein contributions to problem solution are directed in particular directions toward contributions of higher importance problem components in a particular order by incentivizing possible contributors to work on and submit contributions toward particular problem components by adjusting the reward matrix values so that high importance problem components are set with high reward matrix awards values and off-topic response contributions are discouraged by setting them to have a small reward matrix value or no reward matrix value.

27. The method in claim 1, wherein differential rewards are offered for problem solution contributions and dynamically adjusted during the complex problem solution in order to direct the attention of the potential problem solution contributors through the problem tree in a logical and efficient manner toward problem solution without any need to direct or assign problem or sub-problem solution responsibilities.

28. The method in claim 1, wherein contributions to a particular problem solution are received only during predetermined contribution acceptance time periods.

29. The method in claim 28, wherein the predetermined contribution acceptance time periods are time intervals selected from the set of time intervals consisting of one hour, 4 hours, 8 hours, one day, two days, five days, a week, a month, a number of days, a number of hours, a number of weeks, a number of months, and combinations thereof.

30. The method of claim 29, wherein the predetermined contribution time periods are date based time periods.

31. The method of claim 29, wherein the predetermined contribution time periods are variable time periods.

32. The method of claim 29, wherein the predetermined contribution time periods close a period of time for acceptance of contributions and initiate an evaluation of accepted contributions, before opening a new period for accepting contributions.

33. The method of claim 29, wherein the predetermined contribution acceptance time periods are selected to motivate contributions submittal and evaluation.

34. The method in claim 28, wherein the predetermined contribution acceptance time periods are controlled by a customer requesting solution to a problem.

35. The method in claim 1, wherein the problem tree is selectively pruned or filtered to display only node and branch portions or an equivalent list that have a higher than associated threshold reward value.

36. The method in claim 35, wherein the threshold reward value is established by a contributor desiring to make a contribution to solving the problem.

37. The method in claim 36, wherein the threshold reward value is established by a customer requesting solution to the problem.

38. The method in claim 1, wherein the reward values within the reward matrix are set as a maximum reward values and an actual reward remitted to a contributor is determined based on the extent to which the contribution actually contributed to the solution of the problem or to the sub-problem associated with the node.

39. The method in claim 38, wherein an actual reward remitted to a contributor includes a minimum reward for making a relevant contribution substantially independent of the quality of the contribution.

40. The method of claim 39 wherein the minimum reward is identified with the problem node.

41. The method in claim 1, further comprising controlling search capability using a tree structure.

42. The method in claim 41, further comprising controlling search characteristics using a tree structure and a search technique selected from the set of search techniques consisting of generate-and-test, hill climbing, breadth-first search, depth-first search, best-first search, problem reduction techniques, back-propagation techniques, constraint satisfaction techniques, means-ends analysis, branch-and-bound techniques, nearest neighbor algorithm, divide-and conquer techniques, back-chaining techniques, minimax searches with and without cutoffs, as well as the use of heuristic search functions, and combinations thereof.

43. A method according to claim 42, wherein the use of the search method comprises limiting a number of sub-problems that may be submitted in response to the particular one of the sub-problems.

44. The method in claim 1, further comprising controlling search capability using a threaded discussion group.

45. The method in claim 44, further comprising controlling search characteristics using a tree structure and a search technique selected from the set of search techniques consisting of generate-and-test, hill climbing, breadth-first search, depth-first search, best-first search, problem reduction techniques, back-propagation techniques, constraint satisfaction techniques, means-ends analysis, branch-and-bound techniques, nearest neighbor algorithm, divide-and conquer techniques, back-chaining techniques, minimax searches with and without cutoffs, as well as the use of heuristic search functions, and combinations thereof.

46. A method according to claim 45, wherein the use of the search method comprises limiting a number of sub-problems that may be submitted in response to the particular one of the sub-problems.

47. The method in claim 1, further comprising presenting a display of elements of the problem tree in a list on a computer display screen with an associated reward matrix reward value.

48. The method in claim 1, further comprising presenting a display of open problem elements of problem trees in a list with associated reward matrix reward values.

49. The method in claim 1, further comprising presenting a display of open problem elements of problem trees in a hierarchical list with each level shown as an indented sub-list with associated reward matrix reward values.

50. The method in claim 1, wherein the problem tree comprises a problem tree for rapid test item development.

51. The method in claim 1, wherein the problem tree comprises a problem tree for rapid scoring of constructed response and essay-types of test items.

52. The method in claim 1, wherein the problem tree comprises a problem tree for rapid association of educational content with test items or sections.

53. The method in claim 1, wherein the problem tree comprises a problem tree for rapid development of new educational content.

54. The method in claim 1, wherein the problem tree comprises a problem tree for identification, development, and sharing of educational best practices.

55. The method in claim 1, wherein the problem tree comprises a problem tree for financial analysis.

56. The method in claim 1, wherein the problem tree comprises a problem tree for technical analysis.

57. The method in claim 1, wherein the problem tree comprises a problem tree for scientific analysis.

58. A method according to claim 1, wherein said problem solution contribution comprises a contributed sub-problem.

59. A method according to claim 58, further comprising assigning at least a portion of the reward value associated with the particular one of the sub-problems to the contributed sub-problem.

60. A method according to claim 1, wherein:
the complex problem has no known predetermined algorithmic solution in advance of the receipt of the complex problem to be solved; and
the method further includes the step of receiving at least one input from an external source that is used to identify a set of procedures for contributing to the solution of the complex problem.

61. A method according to claim 60, wherein the at least one input from an external source comprises a plurality of inputs from a plurality of human contributors.

62. A method according to claim 1, wherein the dynamic modification to the complex problem formulation is performed between the time the complex problem is initially presented for solution and the time a final solution to the complex problem is identified, and the modification including at least one of (i) modification of the sub-problems presented for solution and (ii) modification of the reward matrix values assigned to the sub-problems.

63. A method according to claim 62, wherein the dynamically modifying the complex problem formulation in response to a received problem solution contribution comprises both (i) modification of the sub-problems presented for solution and (ii) modification of the reward matrix values assigned to the sub-problems.

64. A computer program product for use with a computer stored on tangible media and including a program module containing instructions that direct the operation of the computer, the instructions including instructions for:
formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;
associating a reward matrix with said problem tree having reward values identified with at least some of said sub-problems, each reward value comprising a reward that will be remitted to a problem solution contributor for making a problem solving contribution associated with an associated sub-problem;
receiving a problem solution contribution to a particular one of the sub-problems from a particular problem solving contributor;
dynamically modifying the complex problem formulation in response to the received problem solution contribution between the time the complex problem is initially presented for solution and the time a final solution to the complex problem is identified, the dynamically modifying the complex problem formulation comprises a contributor formulating and presenting at least one new sub-problem to be solved in response to problem solution contributions submitted; and
remitting the reward or a portion of the reward associated with the particular one of the sub-problems to the particular problem solving contributor.

65. A computer program product according to claim 64, wherein said problem solution contribution comprises a contributed sub-problem.

66. A computer program product according to claim 65, wherein the instructions further include instructions for assigning at least a portion of the reward value associated with the particular one of the sub-problems to the contributed sub-problem.

67. A computer program product according to claim 64, wherein the dynamic modification to the complex problem formulation including at least one of (i) modification of the sub-problems presented for solution and (ii) modification of the reward matrix values assigned to the sub-problems.

68. A computer program product according to claim 67, wherein the new sub-problems to be solved are presented as a result of a contribution by a human problem solving contributor.

69. A computer program product according to claim 67, wherein the new sub-problems to be solved are presented as a contribution by a human problem solving contributor.

70. A method for solving an educational instructional materials preparation and evaluation complex problem by a plurality of problem solving contributors acting asynchronously over an internet based network said method comprising:
formulating the educational instructional materials preparation and evaluation problem to be solved as a educational problem tree having a plurality of educational materials preparation and evaluation problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;
associating a reward matrix with said educational problem tree having reward values identified with at least some of said sub-problems, each reward value comprising a reward that will be remitted to a problem solution contributor for making a problem solving contribution associated with an associated sub-problem;
receiving a problem solution contribution to a particular one of the sub-problems from a particular problem solving contributor;
dynamically modifying the complex problem formulation in response to the received problem solution contribution between the time the complex problem is initially presented for solution and the time a final solution to the complex problem is identified, the dynamically modifying the complex problem formulation comprises a contributor formulating and presenting new sub-problems to be solved in response to problem solution contributions submitted; and
remitting the reward or a portion of the reward associated with the particular one of the sub-problems to the particular problem solving contributor.

71. A method for solving a complex problem by a plurality of problem solving contributors, the method comprising:
providing a virtual problem space having a tree-based structure comprising a plurality of levels and a plurality of branches, each level comprising one or more sub-problems whose solution contributes to a solution of the complex problem;
assigning a reward value to each of said plurality of branches;
receiving a response to at least one of said sub-problems;
dynamically modifying the virtual problem space including modifying at least one level of sub-problems in response to the received response to at least one of said sub-problems between the time the virtual problem space is initially presented for problem solution contributions and the time a final solution to the complex problem in the virtual problem space is identified, the dynamically modifying the problem space comprises a contributor formulating and presenting at least one new sub-problem to be solved in response to problem solution contributions submitted;

assigning a quality to said response; and determining a reward for the response based on the quality of the response and the reward values.

72. A method according to claim 71, wherein the quality assigned to said response is determined by an automated system.

73. A method according to claim 71, further comprising:

determining that the reward for the response exceeds an amount of available funds; and transferring funds from a second virtual problem space having no received responses.

74. A method according to claim 71, further comprising:

re-assigning a second reward value to each of said plurality of branches, based on said determined reward.

75. A method according to claim 71, wherein:

the complex problem has no known predetermined algorithmic solution in advance of the receipt of the complex problem to be solved; and the method further includes the step of receiving at least one input from an external source that is used to identify a set of procedures for contributing to the solution of the complex problem.

76. A method according to claim 75, wherein the at least one input from an external source comprises a plurality of inputs from a plurality of human contributors.

77. A method according to claim 71, wherein the entire virtual problem space is accessible to each of the plurality of problem solving contributors.

78. A method according to claim 71 further comprising searching the virtual problem space for a solution to the complex problem.

79. A method according to claim 78, wherein the solution is an optimal solution chosen from a plurality of possible solutions.

80. A method according to claim 78, wherein the act of searching the virtual problem space comprises utilizing the quality assigned to the response to guide the search.

81. A method according to claim 71, wherein the quality assigned to said response is determined by at least one of the problem solving contributors.

82. A method for solving a complex problem by a plurality of human problem solving contributors acting asynchronously over an interactive communication medium, said method comprising:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem, the complex problem having no a priori known algorithmic solution in advance of the receipt of the complex problem by the human problem solving contributors and at least one human problem solving contribution identifying a set of procedures that contributes to the solution of at least one sub-problem;

associating a reward matrix with said problem tree having quantifiable incentive reward values identified with at least some of said sub-problems, each reward value comprising a reward that will be remitted to a problem solution contributor for making a problem solving contribution associated with at least one of said sub-problems, said reward values generating a motivation for said problem solving contributors to submit a problem solving contribution to any sub-problem;

matching to a set of human contributors and presenting the formulated complex problem for solution to the matched set of human contributors over a networked interactive communication medium, wherein the matching includes comparing a database of expert contributors to all problems trees, or sub problems for which solutions are sought;

receiving a particular problem solution contribution to a particular one of the sub-problems from a particular human problem solving contributor asynchronously of other problem solving contribution over said interactive communication medium, at least one of the received problem solving contributions including a contribution identifying a set of procedures for contributing to the solution of the complex problem;

dynamically modifying the complex problem formulation in response to the received problem solution contribution between the time the complex problem is initially presented for solution and the time a final solution to the complex problem is identified, the dynamically modifying the complex problem formulation comprises a contributor formulating and presenting at least one new sub-problem to be solved in response to problem solution contributions submitted; and remitting the reward or a portion of the reward associated with the particular one of the sub-problems to the particular problem solving contributor.

83. A method for solving a complex problem by a plurality of problem solving contributors acting asynchronously over an interactive communication medium, said method comprising:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;

associating a reward matrix with said problem tree having reward values identified with at least some of said sub-problems, each reward value comprising a reward that will be remitted to a problem solution contributor for making a problem solving contribution associated with at least one of said sub-problems;

receiving a problem solution contribution to a particular one of the sub-problems from a particular problem solving contributor;

dynamically modifying the complex problem formulation during its solution in response to at least one received problem solution contribution, the dynamic modification to the complex problem formulation is performed between the time the complex problem is initially presented for solution and the time a final solution to the complex problem is identified, and the modification including at least one of (i) modification of the sub-problems presented for solution and (ii) modification of the reward matrix values assigned to the sub-problems;

remitting the reward or a portion of the reward associated with the particular one of the sub-problems to the particular problem solving contributor; and the dynamic modification to the complex problem formulation comprises formulating and presenting new sub-problems to be solved.

84. A method for solving a complex problem by a plurality of problem solving contributors acting asynchronously over an interactive communication medium, said method comprising:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;

associating a reward matrix with said problem tree having reward values identified with at least some of said sub-problems, each reward value comprising a reward that will be remitted to a problem solution contributor for making a problem solving contribution associated with at least one of said sub-problems;

receiving a problem solution contribution to a particular one of the sub-problems from a particular problem solving contributor;

dynamically modifying the complex problem formulation during its solution in response to at least one received problem solution contribution, the dynamic modification to the complex problem formulation is performed between the time the complex problem is initially presented for solution and the time a final solution to the complex problem is identified, and the modification including at least one of (i) modification of the sub-problems presented for solution and (ii) modification of the reward matrix values assigned to the sub-problems;

remitting the reward or a portion of the reward associated with the particular one of the sub-problems to the particular problem solving contributor; the dynamic modification to the complex problem formulation comprises formulating and presenting new sub-problems to be solved; and the new sub-problems to be solved are presented as a result of a contribution by a human problem solving contributor.

85. A method for solving a complex problem by a plurality of problem solving contributors acting asynchronously over an interactive communication medium, said method comprising:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;

associating a reward matrix with said problem tree having reward values identified with at least some of said sub-problems, each reward value comprising a reward that will be remitted to a problem solution contributor for making a problem solving contribution associated with at least one of said sub-problems;

receiving a problem solution contribution to a particular one of the sub-problems from a particular problem solving contributor;

dynamically modifying the complex problem formulation during its solution in response to at least one received problem solution contribution, the dynamic modification to the complex problem formulation is performed between the time the complex problem is initially presented for solution and the time a final solution to the complex problem is identified, and the modification including at least one of (i) modification of the sub-problems presented for solution and (ii) modification of the reward matrix values assigned to the sub-problems;

remitting the reward or a portion of the reward associated with the particular one of the sub-problems to the particular problem solving contributor; the dynamic modification to the complex problem formulation comprises formulating and presenting new sub-problems to be solved; and the new sub-problems to be solved are presented as a contribution by a human problem solving contributor.

86. A computer program product for use with a computer stored on tangible media and including a program module containing instructions that direct the operation of the computer, the instructions including instructions for:

formulating the complex problem to be solved as a problem tree having a plurality of problem nodes and problem branches coupling said problem nodes, wherein each of said plurality of problem nodes comprises either a sub-problem or a solution or partial solution to a sub-problem, and wherein contributions to the sub-problem or solutions or partial solutions to the sub-problems contribute to solution of the complex problem;

associating a reward matrix with said problem tree having reward values identified with at least some of said sub-problems, each reward value comprising a reward that will be remitted to a problem solution contributor for making a problem solving contribution associated with an associated sub-problem;

receiving a problem solution contribution to a particular one of the sub-problems from a particular problem solving contributor;

dynamically modifying the complex problem formulation in response to the received problem solution contribution between the time the complex problem is initially presented for solution and the time a final solution to the complex problem is identified; and remitting the reward or a portion of the reward associated with the particular one of the sub-problems to the particular problem solving contributor; and wherein the dynamically modifying the complex problem formulation including at least one of (i) modification of the sub-problems presented for solution and (ii) modification of the reward matrix values assigned to the sub-problems; and wherein at least one of the following is true: (a) the dynamic modification to the complex problem formulation comprises formulating and presenting new sub-problems to be solved; (b) the new sub-problems to be solved are presented as a result of a contribution by a human problem solving contributor, and (c) the new sub-problems to be solved are presented as a contribution by a human problem solving contributor.

87. A computer program product according to claim 86, wherein the dynamically modifying the complex problem formulation in response to a received problem solution contribution comprises both (i) modification of the sub-problems presented for solution and (ii) modification of the reward matrix values assigned to the sub-problems.

* * * * *